United States Patent
Mori et al.

(10) Patent No.: US 12,475,934 B2
(45) Date of Patent: Nov. 18, 2025

(54) MEMORY DEVICE AND METHOD FOR OPERATING MEMORY DEVICE

(71) Applicant: TAIWAN SEMICONDUCTOR MANUFACTURING COMPANY, LTD., Hsinchu (TW)

(72) Inventors: Haruki Mori, Hsinchu (TW); Je Min Hung, Kaohsiung (TW); Hidehiro Fujiwara, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 128 days.

(21) Appl. No.: 18/415,960

(22) Filed: Jan. 18, 2024

(65) Prior Publication Data
US 2025/0239281 A1    Jul. 24, 2025

(51) Int. Cl.
| | | |
|---|---|---|
| G11C 7/12 | (2006.01) |
| G11C 5/14 | (2006.01) |
| G11C 7/10 | (2006.01) |
| G11C 7/16 | (2006.01) |
| G11C 11/40 | (2006.01) |
| G11C 11/56 | (2006.01) |
| G11C 11/405 | (2006.01) |
| G11C 11/406 | (2006.01) |
| G11C 11/407 | (2006.01) |

(52) U.S. Cl.
CPC .............. *G11C 7/1063* (2013.01); *G11C 7/12* (2013.01); *G11C 7/16* (2013.01); *G11C 11/405* (2013.01); *G11C 11/406* (2013.01); *G11C 11/407* (2013.01)

(58) Field of Classification Search
CPC . G11C 11/405; G11C 11/406; G11C 11/4074; G11C 11/4076; G11C 1/4097; G11C 11/565; G11C 5/145; G11C 7/1006; G11C 7/12; H10B 12/00; G06N 3/063
USPC .......................................................... 365/191
See application file for complete search history.

(56) References Cited

U.S. PATENT DOCUMENTS

| | | | |
|---|---|---|---|
| 2019/0354508 A1* | 11/2019 | Mahurin ............. | G06F 9/30036 |
| 2021/0072986 A1* | 3/2021 | Yudanov ............. | G11C 7/1006 |
| 2022/0165315 A1* | 5/2022 | Yang ........................ | G11C 7/12 |
| 2022/0375508 A1* | 11/2022 | Chang ................. | G11C 11/4096 |
| 2022/0415369 A1* | 12/2022 | Khwa .................... | G11C 7/065 |

(Continued)

*Primary Examiner* — Ly D Pham
(74) *Attorney, Agent, or Firm* — Birch, Stewart, Kolasch & Birch, LLP

(57) ABSTRACT

A memory device is provided. The memory device includes a compute-in-memory (CIM) array, capacitor circuit pairs, a first switch circuit and an analog-to-digital converter. The CIM array includes bit cells arranged in columns, in which the CIM array generates, in response to an input vector and a stored vector in the bit cells, accumulation results. The capacitor circuit pairs receive the accumulation results through bit lines, in which portions, in one of the columns, of the bit cells and a corresponding one of capacitor circuit pairs are coupled to a corresponding bit line of the bit lines. The first switch circuit is coupled to the capacitor circuit pairs is switched to generate, based on the accumulation results, weight mean results in one capacitor circuit in each of the plurality of capacitor circuit pairs. The analog-to-digital converter generates, according to the plurality of weight mean results, a multiply-and-accumulate result.

20 Claims, 17 Drawing Sheets

(56) References Cited

U.S. PATENT DOCUMENTS

2023/0290402 A1\*  9/2023  Khwa ..................... G11C 11/54
2025/0191652 A1\*  6/2025  Fujiwara ............... G11C 11/419

\* cited by examiner

400

401 — PERFORMING A MULTIPLY-ACCUMULATE OPERATION OF AN INPUT VECTOR AND A STORED VECTOR IN A NUMBER OF CYCLES, EACH CYCLE CORRESPONDING TO PORTIONS OF BITS IN ELEMENTS OF THE INPUT VECTOR

402 — PERFORMING MULTIPLICATION OPERATIONS OF CORRESPONDING BITS IN THE INPUT VECTOR AND THE STORED VECTOR, AND STORING MULTIPLICATION RESULTS IN BIT CELLS OF A MEMORY DEVICE

403 — PERFORMING ACCUMULATION OPERATIONS TO THE MULTIPLICATION RESULTS, AND STORING ACCUMULATION RESULTS TO CAPACITOR CIRCUITS OF THE MEMORY DEVICE THROUGH BIT LINES COUPLED TO THE BIT CELLS

404 — CHARGE-SHARING COMPUTING CAPACITORS IN THE CAPACITOR CIRCUITS TO GENERATE A WEIGHTED MEAN RESULT OF THE ACCUMULATION RESULTS AND STORING THE WEIGHTED MEAN RESULT IN A CORRESPONDING ONE CAPACITOR IN THE COMPUTING CAPACITORS

405 — GENERATING A MULTIPLY-ACCUMULATE RESULT OF THE MULTIPLY-ACCUMULATE OPERATION THROUGH CHARGE-SHARING THE COMPUTING CAPACITORS

FIG. 17

MEMORY DEVICE AND METHOD FOR OPERATING MEMORY DEVICE

BACKGROUND

In machine learning applications, computations like dot product multiplications are frequently processed to data stores in a memory. To shorten the time for computation, compute-in-memory (CIM) devices are used to process dot product multiplications based on performing multiply-accumulate (MAC) operations.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 17 is a flow chart of a method for operating memory devices corresponding to FIG. 1 to FIG. 16 in accordance with various embodiments of the present disclosure.

DETAILED DESCRIPTION

Figure 1:
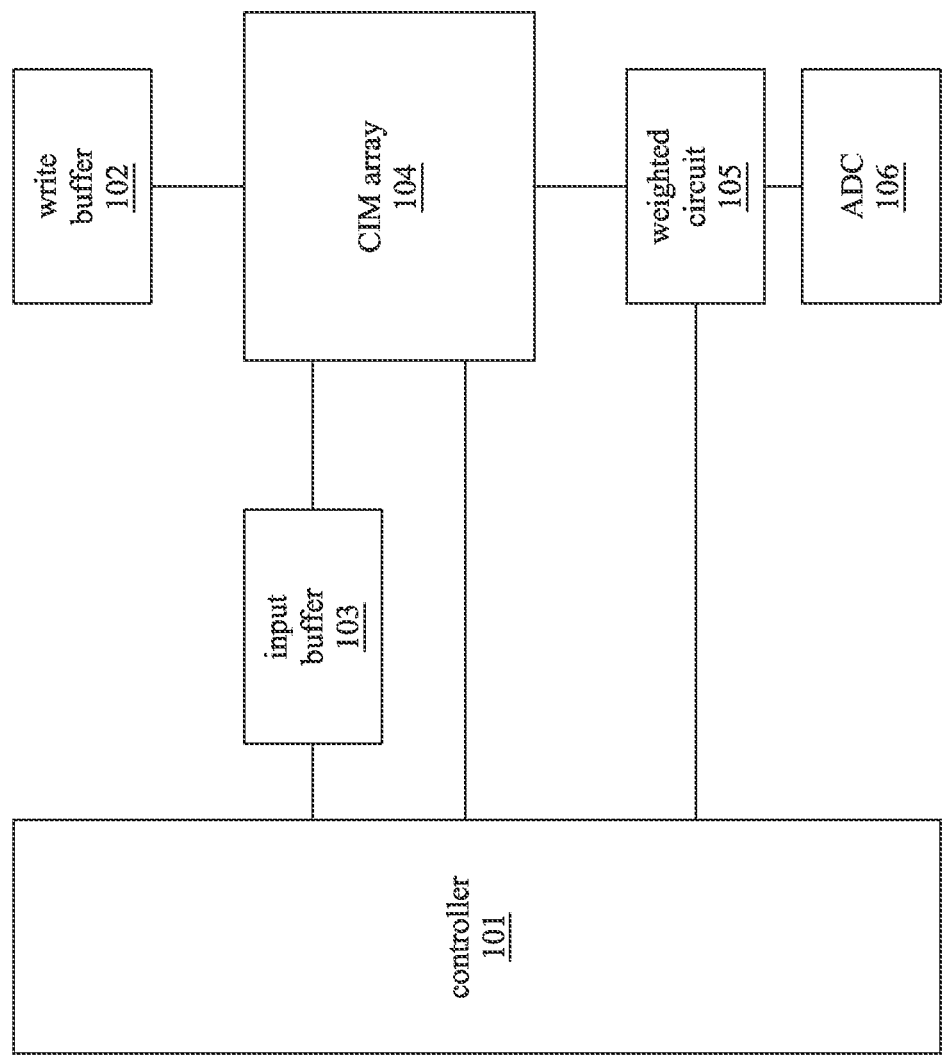
FIG. 1 is a schematic diagram of a memory device in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., are used herein to describe various elements, these elements should not be limited by these terms. These terms are used to distinguish one element from another. For example, a first element could be termed a second element, and, similarly, a second element could be termed a first element, without departing from the scope of the embodiments.

Neural networks use multiple layers of computational nodes, where deeper layers perform computations based on results of computations performed by higher layers. The computation of large and deep neural networks typically involves so many data elements, and thus it is not practical to store them in processor cache. Accordingly, these data elements are usually stored in a memory. However, the transfer of data elements between a processor and the memory becomes a major bottleneck for AI computations. In this regard, computing-in-memory (CIM) device have been proposed to suppress the latency for data fetch and output results upload to a memory. A CIM device performs calculations at memory cell level, rather than moving large quantities of data between memory and processor for each computation step, thus enabling faster computations of neural network.

Reference will now be made in detail to the embodiments of the present disclosure, examples of which are illustrated in the accompanying drawings. Wherever possible, the same reference numbers and annotations are used in the drawings and the description to refer to the same or like parts.

Reference is now made to FIG. 1. FIG. 1 is a schematic diagram of a memory device 100, in accordance with various embodiments of the present disclosure. In some embodiments, the memory device 100 is an integrated circuit (IC) device. In some embodiments, the memory device 100 is a CIM memory device configured to perform CIM operations.

For illustration, as shown in FIG. 1, the memory device 100 includes a controller 101, a write buffer 102, an input buffer 103, a compute-in-memory (CIM) array 104, a computing circuit 105 and an analog-to-digital converter (ADC) 106. The controller 101 is coupled to the write buffer 102, the input buffer 103 and the computing circuit 105. The write buffer 102 and the input buffer 103 are further coupled to the CIM array 104. The CIM array 104 is further coupled to the computing circuit 105. The computing circuit 105 is further coupled to the ADC 106.

The CIM array 104 is configured to store weight data or activation data for one or more computational nodes of a neural network. The controller 101 controls the CIM array 104 and the computing circuit 105 to perform a CIM operation for the computational nodes based on input data from the input buffer 103 and the weight data or activation data stored in the CIM array 104. The ADC 106 generates a digital representation of a result of the CIM operation. After one or more CIM operations, the weight data or activation data stored in the CIM array 104 are replaced by data received from the write buffer 102 for further CIM operations. Further details about configurations and operations of the components of the memory device 100 are described in the following paragraphs.

According to various embodiments, the controller 101 includes one or more clock generators for providing clock signals for various components of the memory device 100, one or more input/output (I/O) circuits for data exchange with external devices, and one or more control circuits (e.g., a word line driver and/or a bit line driver) for controlling various components in the memory device 100.

According to the data flow technique used for CIM operations of the memory device 100, the write buffer 102 is configured to temporarily hold new weight data or activation data to be updated in the CIM array 104. In some embodiments, the controller 101 receives the new weight data or activation data from external circuitry outside the memory device 100, for example, a processor, through the one or more I/O circuits of the controller 101 and forwards the new weight data or activation data to the write buffers 102. According to some embodiments, the write buffer 102 includes, but not limited to, registers, memory cells, or other circuit elements configured for data storage.

The input buffer 103 is configured to receive input data to perform a CIM operation with the weight data or activation data stored in the CIM array 104. In some embodiments, when the CIM array 104 stores weight data of one or more computational nodes of a neural network, the input buffer 103 is configured to receive activation data that are input of the computational nodes. In various embodiments, alternatively, when the CIM array 104 stores activation data input to one or more computational nodes of a neural network, the input buffer 103 is configured to receive weight data of the computational nodes. According to some embodiments, the input buffer 103 receives the input data from external circuitry outside the memory device 100, for example, a processor, through the one or more I/O circuits of the memory controller 101 and forwards the input data to the CIM array 104. The input buffers 103 includes, but are not limited to, registers, memory cells, or other circuit elements configured for data storage.

The configurations of FIG. 1 are given for illustrative purposes. Various implements are within the contemplated scope of the present disclosure. For example, in some embodiments, the controller 101 is coupled to the CIM array 104 through additional lines to control the CIM array 104.

Figure 2:
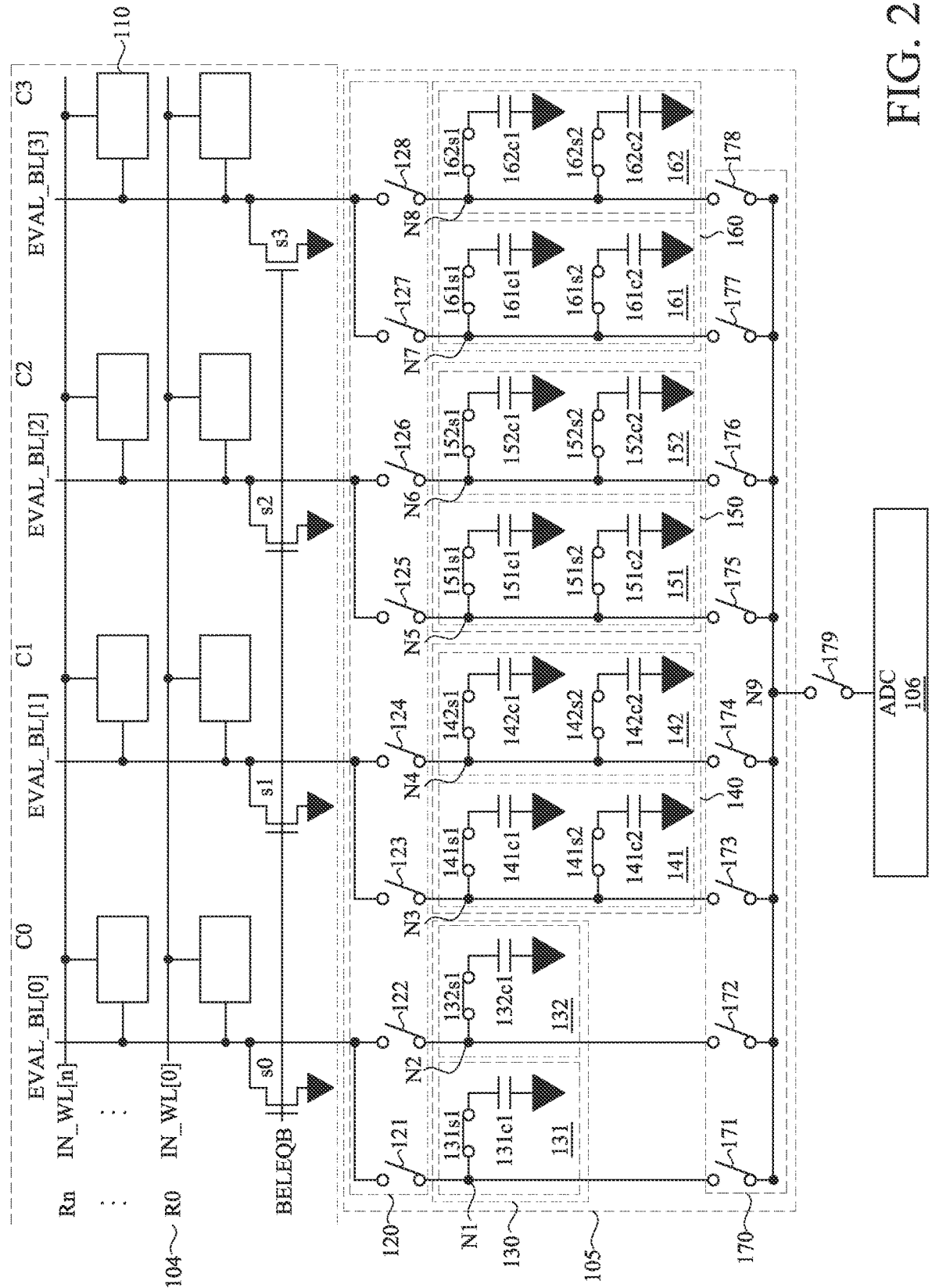
FIG. 2 is a schematic diagram of a CIM array, a computing circuit and an analog-to-digital converter, in accordance with various embodiments of the present disclosure.

Reference is now made to FIG. 2. FIG. 2 is a schematic diagram of the CIM array 104, the computing circuit 105 and the ADC 106, in accordance with various embodiments of the present disclosure. For illustration, the CIM array 104 includes multiple bit cells 110 configured to store data. The bit cells 110 are arranged in four columns C0 to C3 and multiple rows R0 to Rn. The columns C0 to C3 correspond to bit lines EVAL_BL[0] to EVAL_BL[3] respectively. Each bit cell 110 in a column is coupled to a corresponding one of the bit lines EVAL_BL[0] to EVAL_BL[3]. The rows R0 to Rn correspond to word lines IN_WL[0] to IN_WL[n] respectively. Bit cells 110 in a row are coupled to a corresponding one of the word lines IN_WL[0] to IN_WL[n].

Each bit cell 110 is configured to store a portion of weight data or activation data to be used in a CIM operation. According to some embodiments of the present disclosure, the bit cell 110 is configured to store one bit of data. In some embodiments, the write buffer 102 is coupled to each bit cell 110. In a weight data updating operation or activation data updating operation, the write buffer 102 writes the new weight or activation data from to one or more the bit cells 110. In some embodiments, the write buffer 102 writes the weight or activation data received from the controller 101 to the one or more the bit cells 110. In some embodiments, the write buffer 102 writes the weight or activation data according to control signals from the controller 101 that specify when and/or in which bit cells 110 are to be updated.

The input buffer 103 is coupled to the bit cells 110 through the word lines IN_WL[0] to IN_WL[n]. The input buffer 103 forwards weight or activation data from the controller 101 as input data to one or more bit cells 110 through the word lines IN_WL[0] to IN_WL[n] for a CIM operation. Then, the bit cells 110 output results of the computations to the bit lines EVAL_BL[0] to EVAL_BL[3]. For example, a bit cell 110 stores a bit of weight data and receive a bit of activation data from the input buffer 103; and the bit cell 110 performs a multiplication operation of the bit of weight data and the bit of activation data for a CIM operation (e.g., a MAC operation) and outputs a result of the multiplication to the one of the bit lines EVAL_BL[0] to EVAL_BL[3] that the bit cell 110 is coupled to.

In some embodiments, the CIM array 104 further includes four switches s0 to s3. The switches s0 to s3 are configured to reset the voltage of the bit lines EVAL_BL[0] to EVAL_BL[3] respectively. In at least one embodiment, the switches s0 to s3 are transistors, for example, n-type metal-oxide-semiconductor field-effect (NMOS) transistors. Source/drain terminals of the switches s0 to s3 are grounded and drain/source terminals of the switches s0 to s3 are coupled to the bit lines EVAL_BL[0] to EVAL_BL[3] respectively. Gate terminals of the switches s0 to s3 is coupled to a control line BLEQB. In some embodiments, the controller 101 adjusts the voltage of the control line BLEQB to turn on the switches s0 to s3 to reset the bit lines EVAL_BL[0] to EVAL_BL[3] to have a ground voltage level.

As shown in FIG. 2, in some embodiments, the computing circuit 105 includes a switch circuit 120, a capacitor circuit pair 130, a capacitor circuit pair 140, a capacitor circuit pair 150, a capacitor circuit pair 160 and a switch circuit 170. The switch circuit 120 is coupled to the CIM array 104 through the bit lines EVAL_BL[0] to EVAL_BL[3]. The capacitor circuit pairs 130 to 160 are coupled between the switch circuits 120 and 170. The switch circuit 170 is further coupled to the ADC 106.

According to some embodiments, the switch circuit 120 includes switches 121 to 128. The capacitor circuit pair 130 includes a capacitor circuit 131 and a capacitor circuit 132. The capacitor circuit pair 140 includes a capacitor circuit 141 and a capacitor circuit 142. The capacitor circuit pair 150 includes a capacitor circuit 151 and a capacitor circuit 152. The capacitor circuit pair 160 includes a capacitor circuit 161 and a capacitor circuit 162. The switch circuit 170 includes switches 171 to 179.

First terminals of the switches 121 and 122 are coupled to the bit line EVAL_BL[0]; and second terminals of the switches 121 and 122 are coupled to the capacitor circuits 131 and 132 respectively. First terminals of the switches 123 and 124 are coupled to the bit line EVAL_BL[1]; and second terminals of the switches 123 and 124 are coupled to the capacitor circuits 141 and 142 respectively. First terminals of the switches 125 and 126 are coupled to the bit line EVAL_BL[2]; and second terminals of the switches 125 and 126 are coupled to the capacitor circuits 151 and 152 respectively. First terminals of the switches 127 and 128 are coupled to the bit line EVAL_BL[3]; and second terminals of the switches 127 and 128 are coupled to the capacitor circuits 161 and 162 respectively.

The capacitor circuits 131, 132, 141, 142, 151, 152, 161 and 162 are operatively coupled to a corresponding one of the bit lines EVAL_BL[0] to EVAL_BL[3] by turning on the switches 121 to 128 respectively. For example, the capacitor circuit 131 is operatively coupled to the bit line EVAL_BL[0] by turning on the switch 121.

First terminals of the switches 171 to 178 are coupled to the capacitor circuits 131, 132, 141, 142, 151, 152, 161 and 162, respectively; second terminals of the switches 171 to 178 are coupled to a first terminal of the switch 179; and a second terminal of the switch 179 is coupled to the ADC 106.

For ease of understanding, as shown in FIG. 2, nodes, in the capacitor circuits 131, 132, 141, 142, 151, 152, 161 and 162, that are coupled to the switches 121 to 128 are annotated as nodes N1 to N8 separately. In some embodiments, the switches 171 to 178 are coupled to the node N1 to N8 respectively.

In some embodiments, as shown in FIG. 2, each of the capacitor circuits 131, 132, 141, 142, 151, 152, 161 and 162 includes a corresponding one in computing switches 131s1, 132s1, 141s1, 142s1, 151s1, 152s1, 161s1, 162s1 and a corresponding one in computing capacitors 131c1, 132c1, 141c1, 142c1, 151c1, 152c1, 161c1, 162c1. Each of the computing switches in the capacitor circuits 131, 132, 141, 142, 151, 152, 161 and 162 is coupled between the corresponding computing capacitor in the capacitor circuit and the corresponding one of the nodes N1 to N8. For example, the computing switch 131s1 of the capacitor circuit 131 is coupled between the node N1 and the computing capacitor 131c1, and so on.

Each of the computing capacitor in the capacitor circuits 131, 132, 141, 142, 151, 152, 161 and 162 is coupled between the corresponding computing switch of the capacitor circuit and the ground. For example, the computing capacitor 131c1 of the capacitor circuit 131 is coupled between the computing switch 131s1 and the ground, and so on.

In some embodiments, each of the capacitor circuits 131, 132, 141, 142, 151, 152, 161 and 162 includes a corresponding one in compensation switches 141s2, 142s2, 151s2, 152s2, 161s2, 162s2 and a corresponding one in compensation capacitors 141c2, 142c2, 151c2, 152c2, 161c2, 162c2. Each of the compensation switches in the capacitor circuits 141, 142, 151, 152, 161 and 162 is coupled between the corresponding compensation capacitor in the capacitor circuit and the corresponding one of the nodes N1 to N8. For example, the compensation switch 131s2 of the capacitor circuit 131 is coupled between the node N1 and the compensation capacitor 131c2, and so on.

Each of the compensation capacitor in the capacitor circuits 141, 142, 151, 152, 161 and 162 is coupled between the corresponding compensation switch of the capacitor circuit and the ground. For example, the compensation capacitor 131c2 of the capacitor circuit 131 is coupled between the compensation switch 131s2 and the ground, and so on.

In some embodiments, a common ratio of the capacitances of the computing capacitors of the capacitor circuit pairs 130, 140, 150, 160 are 2. For example, each of the computing capacitors 131cl and 132cl has a capacitance 8 cu (eight units of capacitance). Each of the computing capacitors 141cl and 142cl has a capacitance 4 cu (four units of capacitance). Each of the computing capacitors 151cl and 152cl has a capacitance 2 cu (two units of capacitance). Each of the computing capacitors 161cl and 162cl has a capacitance 1 cu (one unit of capacitance).

In some embodiments, a total capacitance of computing capacitor and compensation capacitor in each capacitor circuit is the same. For example, in some embodiments, the total capacitance of computing capacitor and compensation capacitor in each capacitor circuit is 8 cu. Specifically, based on the embodiments of FIG. 2, each of the computing capacitors 131cl and 132cl has a capacitance 8cu. The computing capacitor 141cl (e.g., having 4 cu) and the compensation capacitors 141c2 (e.g., having 4 cu) have a total capacitance of 8 cu. The computing capacitor 151cl (e.g., having 2 cu) and the compensation capacitors 151c2 (e.g., having 6 cu) have a total capacitance of 8 cu. The computing capacitor 161cl (e.g., having 1 cu) and the compensation capacitors 161c2 (e.g., having 7 cu) have a total capacitance of 8 cu.

The configurations of FIG. 2 are given for illustrative purposes. Various implements are within the contemplated scope of the present disclosure. For example, in some embodiments, the CIM array 104 includes only one row of bit cells 110.

Figure 3:
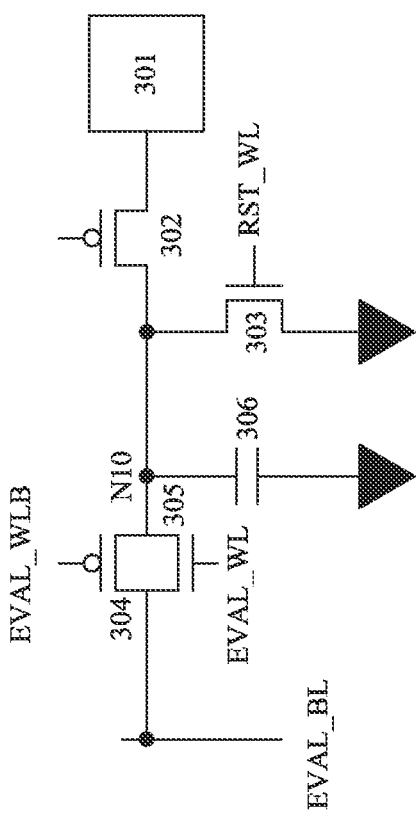
FIG. 3 is a schematic diagram of the bit cell in accordance with various embodiments of the present disclosure.

Reference is now made to FIG. 3. FIG. 3 is a schematic diagram of the bit cell 110 in accordance with various embodiments of the present disclosure. For illustration, in some embodiments, the bit cell 110 includes a storage element 301, transistors 302 to 305, and a capacitor 306. In some embodiments, the storage element 301 is a six-transistor static random-access memory (6T SRAM) cell. The transistors 302 and 304 are p-type metal-oxide-semiconductor field-effect (PMOS) transistors. The transistors 303 and 305 are NMOS transistors.

As shown in FIG. 3, a drain/source terminal of the transistor 302 is coupled to the storage element 301 and a source/drain terminal of the transistor 302 is coupled to the node N10. A gate terminal of the transistor 302 is coupled to a word line IN_WLB (one of word lines IN_WLB[0] to IN_WLB[n] corresponding to the rows R0 to Rn). In some embodiments, the transistor 302 is turned on or off according to a control signal from the controller 101 through the word line IN_WLB. In some embodiments, the control signals on the word lines IN_WLB[0] to IN_WLB[n] are inverted to the signals on word lines IN_WL[0] to IN_WL[n] which are bits of input data.

A drain/source terminal of the transistor 303 is coupled to the node N10 and a source/drain terminal of the transistor 303 is coupled to the ground. A gate terminal of the transistor 303 is coupled to a word line RST_WL. In some embodiments, the transistor 303 is turned on or off according to a control signal from the controller 101 through the word line RST_WL.

A drain/source terminal of the transistor 304 is coupled to a bit line EVAL_BL that is one of the bit lines EVAL_BL[0] to EVAL_BL[3] and a source/drain terminal of the transistor 304 is coupled to the node N10. A gate terminal of the transistor 304 is coupled to a word line EVAL_WLB. In some embodiments, the transistor 304 is turned on or off according to a control signal from the controller 101 through the word line EVAL_WLB.

Similarly, a drain/source terminal of the transistor 305 is coupled to the bit line EVAL_BL and a source/drain terminal of the transistor 305 is coupled to the node N10. A gate terminal of the transistor 305 is coupled to a word line EVAL_WL. In some embodiments, the transistor 305 is turned on or off according to a control signal from the controller 101 through the word line EVAL_WL. In some embodiments, the transistors 304-305 form a transmission gate operating in response to control signals on word lines EVAL_WL and EVAL_WLB.

According to some embodiments, the capacitor 306 is coupled between the node N10 and the ground. Details about operations of the elements of the bit cell 110 in FIG. 3 are described below with reference to FIG. 4 to FIG. 13.

The configurations of FIG. 3 are given for illustrative purposes. Various implements are within the contemplated scope of the present disclosure. For example, in some embodiments, the transistor 302 is a NMOS transistor and the gate terminal of the transistor 302 is coupled to one of the word lines IN_WL[0] to IN_WL[n].

Figure 4:
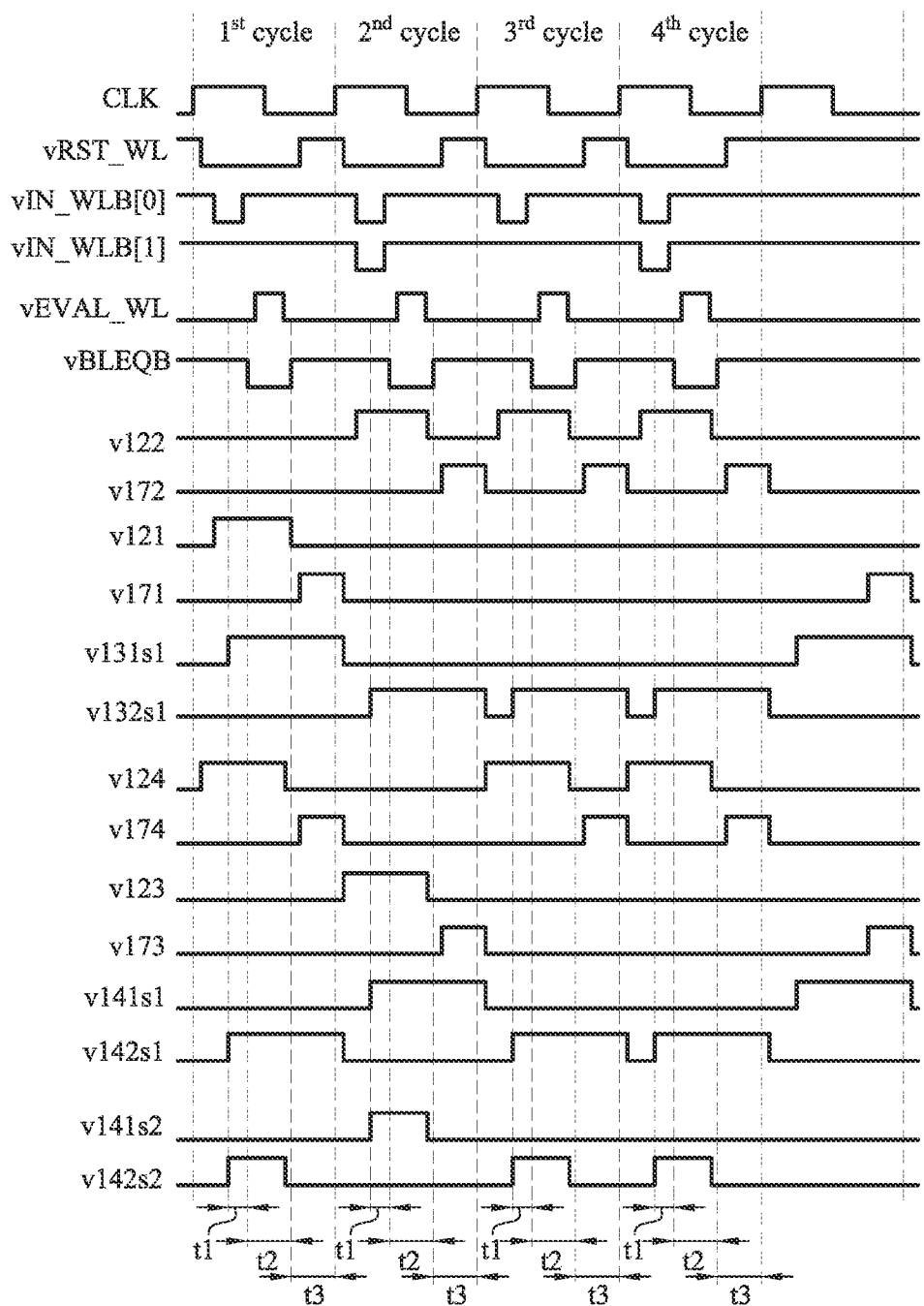
FIG. 4 is a schematic diagram of waveforms in different cycles of a CIM operation of the memory device in accordance with various embodiments of the present disclosure.

Reference is now made to FIG. 2 to FIG. 13. FIG. 4 is a schematic diagram of waveforms in different cycles of a CIM operation of the memory device 100. FIG. 5 to FIG. 13 are schematic diagram of the computing circuit 105 and the ADC 106 in different cycles of the CIM operation of the memory device 100. In some embodiments, the controller 101 adjusts control voltages CLK, VRST_WL, vIN_WL[0]-vIN_WL[n], vIN_WLB[0]-vIN_WLB[n], vEVAL_WL, vBLEQB, v121-v128, v131s1, v132s1, v141sl, v142s1, v151s1, v152s1, v161s1, v162sl, v141s2, v142s2, v151s2, v152s2, v161s2, v162s2, v171-v179 to operate the CIM array 104 and the computing circuit 105.

In some embodiments, an example of the CIM operation performed by the memory device 100 is a MAC operation, in which an array of numbers are multiplied by the respective elements in another array of numbers, and the products are added together (accumulated) to produce an output sum. This is mathematically similar to a dot product (or scalar product) of two vectors, in which procedure the components of two vectors are pair-wise multiplied with each other, and the products of the component pairs are summed.

In some embodiments, the memory device 100 is configured to perform a MAC operation of two vectors with four-bit binary elements. In some embodiments, the memory device 100 is configured to have a CIM array 104 with n+1 rows of bit cells 110 coupled to word lines IN_WL[0] to IN_WL[n] in order to perform the MAC operation of vectors with n+1 elements.

In the embodiments depicted in FIG. 2 to FIG. 13, for example, the CIM array 104 receives an activation vector (a vector of activation data) with n+1 elements of four-bit binary number as input data. The CIM array 104 stores a weight vector (a vector of weight data) with n+1 elements of four-bit binary number in the bit cells 110. Each one of the rows R0 to Rn of bit cells 110 store an element of the weight data. Each one of the columns C0 to C3 of bit cells 110 store a bit of an element of the weight data. For example, to store an element "0101" in the row R0 of bit cells, the bit cell in the row R0 and the column C3 stores the first bit (the least significant bit) "1" of the element in the storage element 301, the bit cell in the row R0 and the column C2 stores the second bit "0" of the element in the storage element 301, and so on. In some embodiments, to perform a MAC operation of the input activation vector and the stored weight vector, the CIM array 104 multiplies bits of the n+1 elements of the activation vector by bits of the n+1 elements of the weight vector in a number of cycles, for example, four cycles, and generate a MAC result of the activation vector and the weight vector after the four cycles.

For an example in which the CIM array 105 has two rows (i.e., n=1) and the input vector to the CIM array 104 has two elements "1111" and "0101" that are input to the word lines IN_WL[0] and IN_WL[1] respectively, a MAC operation of the input vector and the stored vector in the CIM array 104 is described as the following paragraphs.

As shown in FIG. 4, the controller 101 generates a clock signal CLK indicating cycles for performing the MAC operation. In some embodiments, the memory device 100 takes five cycles to finish a MAC operation.

Figure 5:
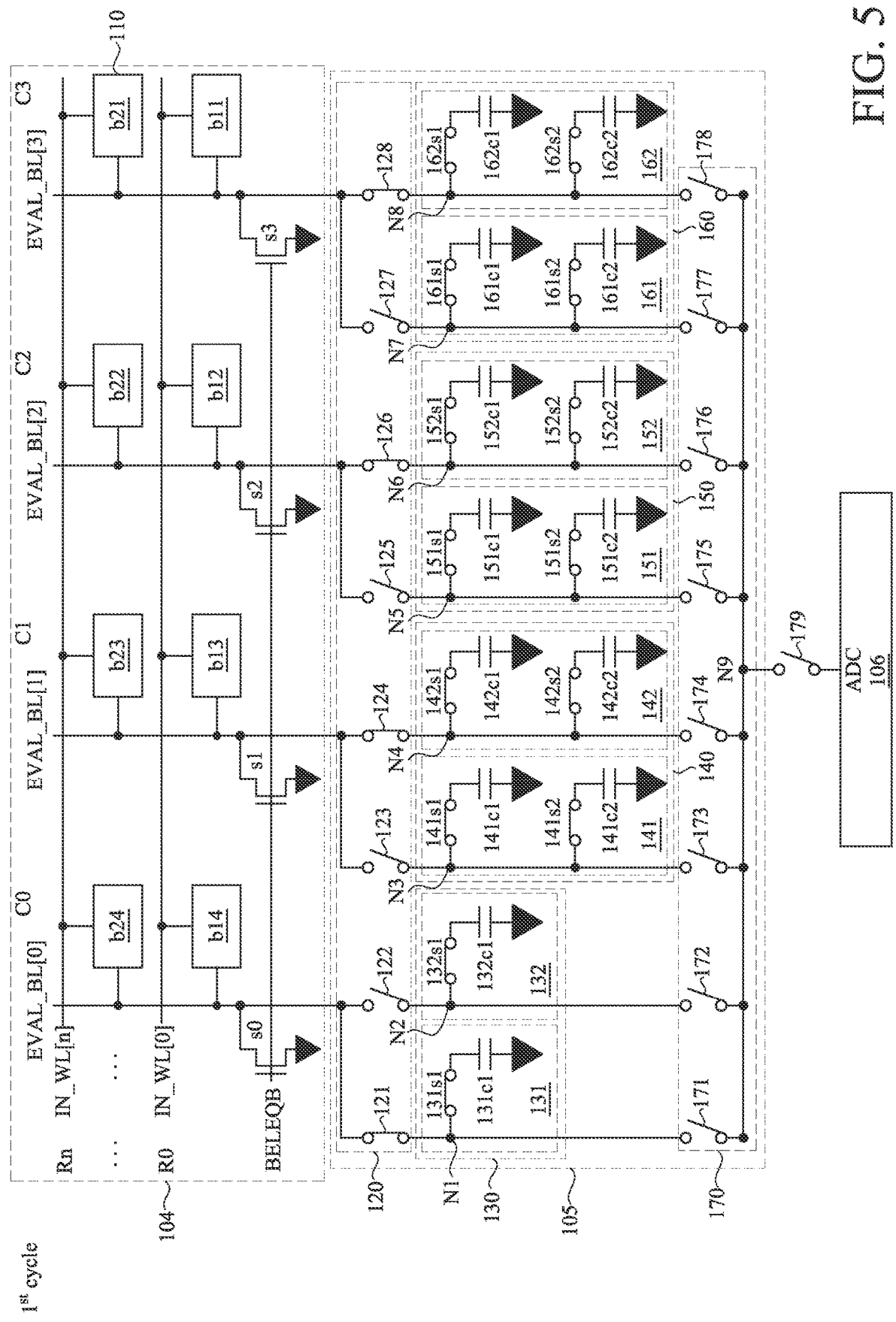
FIG. 5 to FIG. 13 are schematic diagram of a computing circuit and an analog-to-digital converter in different cycles of a CIM operation of a memory device in accordance with various embodiments of the present disclosure.

With reference to FIG. 3 to FIG. 5, in a duration t1 in a first cycle, the CIM array 104 performs a multiplication operation of the MAC operation of the input vector and the stored weight vector and stores corresponding results in the capacitors 306 of the bit cells 110. In some embodiments, the transmission gates in the bit cells110 formed by transistors 304-305 are turned off to disconnect the capacitors 306 from the corresponding bit lines, for example, bit line EVAL_BL.

For example, in some embodiments of the multiplication operation, the input buffer 103 forwards fourth bits (the most significant bit) "1" and "0" of the elements "1111" and "0101" (e.g., two elements in one input vector) to the word lines IN_WL[0] and IN_WL[1] respectively. For example, firstly, in response to the bit "1" input to the word line IN_WL[0], the controller 101 pulls down a control voltage vIN_WLB[0] on the word line IN_WLB[0]. For the bit cells 110 in the row R0, all of the transistors 302 in the bit cells 110 are turned on in response to the control voltage vIN_WLB[0] being pulled down, and each of the storage elements 301 in the bit cells outputs a voltage to the node N10 of FIG. 3, in which the output voltage indicates a bit stored in the corresponding storage element 301. Then the capacitors 306 in the bit cells 110 are charged to have the voltages indicating the bits from the storage elements 301. In this way, each of the capacitors 306 in the bit cells 110 stores the corresponding voltage indicating a multiplication result of the stored bit and the input bit "1".

Meanwhile, for the word line IN_WL[1], in response to the bit "0" input to the word line IN_WL[1], the controller 101 maintains a control voltage vIN_WLB[1] on the word line IN_WLB[1] at a high voltage level. For the bit cells in the row R1, all of the transistors 302 in the bit cells 110 are turned off since the control voltage vIN_WLB[1] is maintained with a high voltage level. Each of the capacitor 306 in the bit cells 110 is not charged and has a ground voltage at the node N10 that indicates a bit "0". In this way, each of the capacitor 306 in the bit cells 110 stores a voltage indicating a multiplication result of the stored bit and the input bit "0".

In the duration t2 of the first cycle, the controller 101 adjusts the control voltages of all word lines IN_WLB (vIN_WLB[0] and vIN_WLB[1]) to have a high voltage level to reset the all word lines and to turn off all the transistors 302 in the bit cells 110. As shown in FIG. 2, the switches s0 to s3 are further turned off in response to the control line BLEQB being pulled down, and accordingly the bit lines EVAL_BL[0] to EVAL_BL[3] are disconnected from the ground.

According to some embodiments, in the duration t2, the CIM array 104 performs an accumulation operation of the MAC operation of the input vector and the stored weight vector to generate accumulation results to the computing circuit 105 through the bit lines, for example, EVAL_BL[0]-EVAL_BL[3].

After the controller 101 pulls down the control voltage vBLEQB, the controller 101 pulls up a control voltage vEVAL_WL on the word line EVAL_WL. In response to the control voltage vEVAL_WL being pulled up, the transistor 305 of each bit cell 110 is turned on. The controller 101 turns on each transistor 305 coupled to a bit line EVAL_BL of FIG. 3 (one of the bit lines EVAL_BL[0] to EVAL_BL[3]) to adjust the voltage of the bit line EVAL_BL to have a voltage level that indicates an accumulation result (sum) of the multiplication results of the input bits and bits stored in the bit cells 110 coupled to the bit line EVAL_BL.

Taking the bit line EVAL_BL[0] as example, the voltage level of the bit line EVAL_BL[0] indicates an accumulation result (sum) of a multiplication result of the input bit "1" and the fourth bit b14 (e.g., bit in the row R0 and the column C0) of a first element (e.g., including bits b11-b14) of the stored vector and a multiplication result of the input bit "0" and the fourth bit b24 (e.g., bit in the row R1 and the column C0) of a second element (e.g., including bits b21-b24), as shown in FIG. 5.

In the duration t2, half (for example, the switches 121, 124, 126, 128) of the switches 121-128 are turned on, in response to the control voltage v121, v124, v126, v128 being pulled up, to transmit the voltages on the bit lines EVAL_BL[0]-EVAL_BL[3] to the capacitor circuit pairs 130, 140, 150 and 160.

Then, the computing switch 131s1 is turned on, in response to the control voltage v131s1 being pulled up, to charge the computing capacitor 131cl according to the voltage on the bit line EVAL_BL[0]. Specifically, the computing capacitor 131cl is charged to store a voltage on the bit line that indicates the accumulation result (the sum of multiplication results) of the input bits and bits stored in the bit cells in the column C0.

Similarly, in the duration t2, the computing switches 142s1, 152s1, 162s1 and the compensation switches 142s2, 152s2, 162s2 are turned on, in response to the control voltages v142s1, v152s1, v162s1, v142s2, v152s2, v162s2 being pulled up, to charge the computing capacitors 142c1, 152c1, 162cl and the compensation capacitors 142c2, 152c2, 162c2. Specifically, each of the computing capacitors 142c1, 152c1, 162cl and the compensation capacitors 142c2, 152c2, 162c2 is charged to store a voltage that indicates the accumulation result (sum) of multiplication results of the input bits and bits stored in the bit cells in the corresponding column. For example, the computing capacitor 142cl and the compensation capacitor 142c are charged to have a voltage that indicates the accumulation result (sum) of multiplication results of the input bits and bits stored in the bit cells in the column C1.

Figure 6:
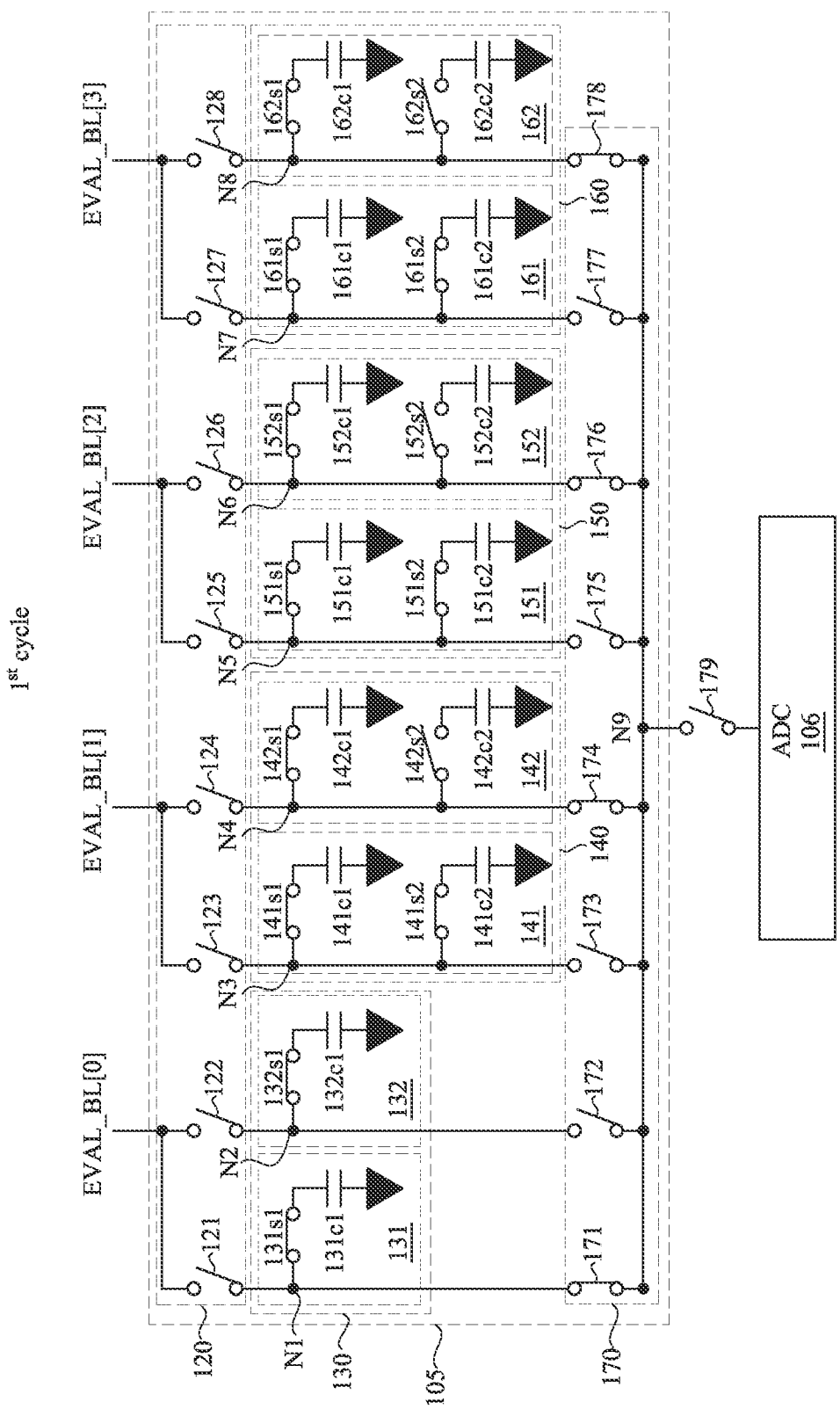

With reference to FIG. 3, FIG. 4 and FIG. 6, in a duration t3 of the first cycle, the switches 121, 124, 126, 128 are turned off in response to the control voltages v121, v124, v126, v128 being pulled down. The switches s0 to s3 are turned on in response to the control voltage vBLEQB pulled up. The transistor 303 is turned on, in response to the control voltage vRST_WL on the word line RST_WL being pulled up, to discharge the capacitor 306 to have the ground voltage.

Furthermore, in the duration t3, the controller 110 controls the switch circuit 170 to charge-share the computing capacitors in the four columns to get a weighted mean result of the accumulation results stored in the capacitor circuits of computing capacitors in the four columns.

Specifically, in the duration t3 of the first cycle, the compensation switches 142s2, 152s2 and 162s are turned off in response to the control voltages v142s2, v152s2 and v162s2 being pulled down, and the switches 171, 174, 176, 178 are turned on, in response to the control voltages v171, v174, v176 and v178 being pulled up, to charge-share the computing capacitors 131c1, 142c1, 152c1, 162c1. Specifically, the computing capacitors 131c1, 142c1, 152c1, 162cl are charge-shared to perform a weighted mean operation of the data stored in the computing capacitors 131c1, 142c1, 152c1, 162c1, in which the data are sum of multiplication results (MAC results) from bit lines EVAL_BL[0] to EVAL_BL[3]. The weights for the weighted mean operation are according to the capacitances of the computing capacitors 131c1, 142c1, 152c1, 162c1. For example, the weights of the weighted mean operation for the data stored in the computing capacitors 131c1, 142c1, 152c1, 162c1 are 8, 4, 2 and 1 respectively when the capacitances of the computing capacitors 131c1, 142c1, 152c1, 162c1 are 8 cu, 4 cu, 2 cu and 1 cu. After the charge-sharing of the computing capacitors 131c1, 142c1, 152c1, 162c1, the computing capacitor 131cl has the voltage indicating the weighted mean result of the weighted mean operation. For example, a voltage with a voltage value $(8*v1+4*v2+2*v3+1*v4)/15$, in which the voltage values v1 to v4 are voltages of the computing capacitors 131c1, 142c1, 152c1, 162c1 respectively.

Then, the computing switches 131s1, 142s1, 152s1, 162s1 and the switches 171, 174, 176, 178 are turned off, in response to the control signals v131s1, v142s1, v152s1, v162s1, v171, v174, v176, v178 being pulled down, to terminate the charge-sharing.

Figure 7:
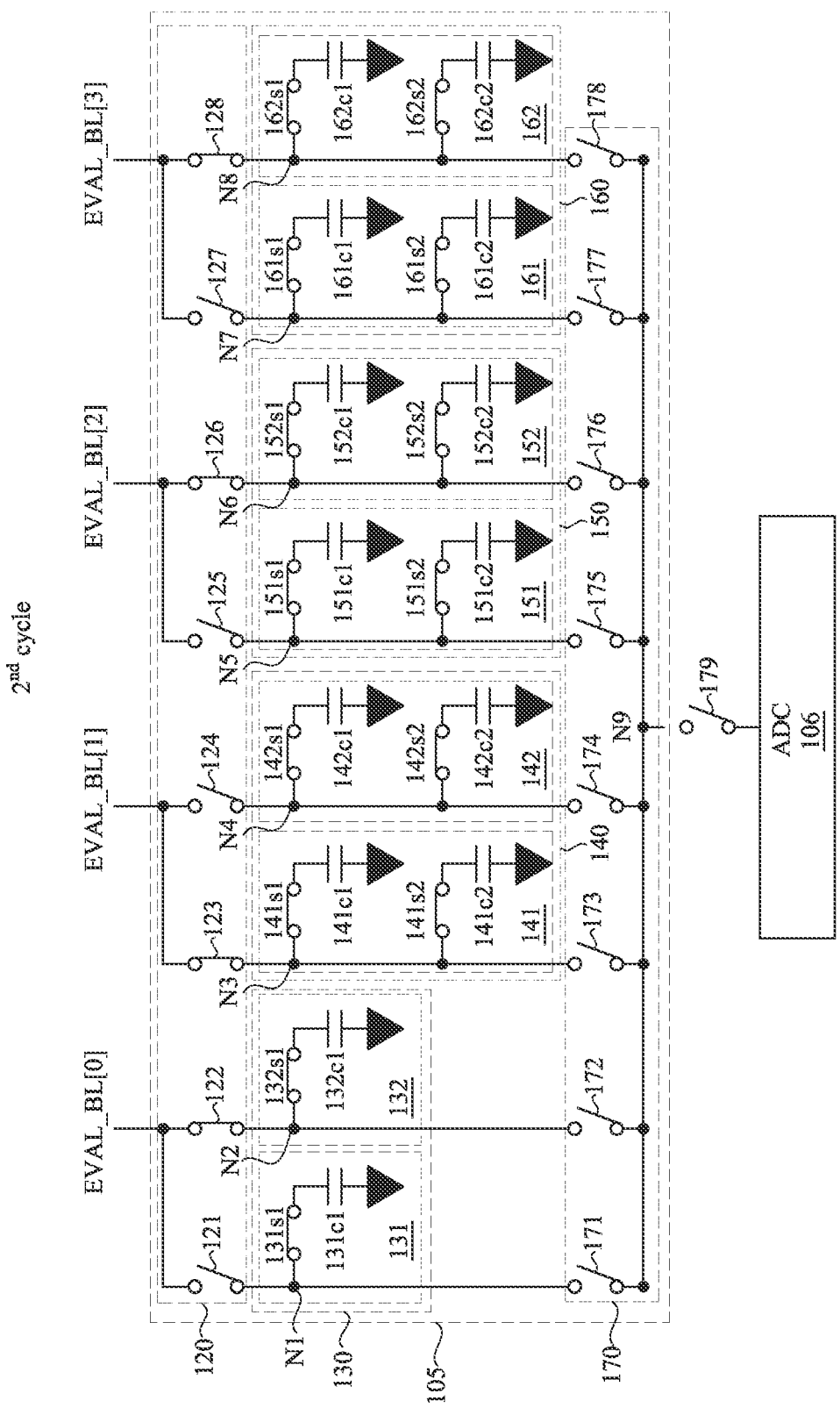

With reference to FIG. 3, FIG. 4 and FIG. 7, in a duration t1 in a second cycle, the CIM array 104 performs a multiplication operation of the MAC operation of next bits in the input vector and the stored weight vector and stores corresponding results in the capacitors 306 of the bit cells 110. The configurations of the multiplication operation of the MAC operation are similar to those in the first cycle for the fourth bits (MSB) of the input vector.

For example, in some embodiments of the multiplication operation, the input buffer 103 forwards third bits "1" and "1" of the elements "1111" and "0101" (e.g., two elements in one input vector) to the word lines IN_WL[0] and IN_WL[1] respectively. For example, firstly, in response to the bit "1" input to the word lines IN_WL[0] and IN_WL[0], the controller 101 pulls down the control voltages vIN_WLB[0] and vIN_WLB[1]. For the bit cells 110 in the rows R0 and R1, all of the transistors 302 in the bit cells 110 are turned on in response to the control voltages vIN_WLB[0] and vIN_WLB[1] being pulled down, and each of the storage elements 301 in the bit cells outputs a voltage to the node N10 of FIG. 3, in which the output voltage indicates a bit stored in the corresponding storage element 301. Then the capacitors 306 in the bit cells 110 are charged to have the voltages indicating the bits from the storage elements 301. In this way, each of the capacitors 306 in the bit cells 110 stores the corresponding voltage indicating a multiplication result of the stored bit and the input bit "1".

In the duration t2 of the second cycle, the controller 101 adjusts the control voltages of all word lines IN_WLB (vIN_WLB[0] and vIN_WLB[1]) to have a high voltage level to reset the all word lines and to turn off all the transistors 302 in the bit cells 110. As shown in FIG. 2, the switches s0 to s3 are further turned off in response to the control line BLEQB being pulled down, and accordingly the bit lines EVAL_BL[0] to EVAL_BL[3] are disconnected from the ground.

According to some embodiments, in the duration t2, the CIM array 104 performs an accumulation operation of the MAC operation of the input vector and the stored weight vector to generate accumulation results to the computing circuit 105 through the bit lines, for example, EVAL_BL[0]-EVAL_BL[3].

In the duration t2, the switches 122, 123, 126, 128 are turned on, in response to the control voltage v122, v123, v126, v128 being pulled up, to transmit the voltages on the bit lines EVAL_BL[0]-EVAL_BL[3] to the capacitor circuit pairs 130, 140, 150 and 160.

Then, the computing switch 132s1 is turned on, in response to the control voltage v132s1 pulled up, to charge the computing capacitor 132cl according to the voltage on the bit line EVAL_BL[0]. Specifically, the computing capacitor 132$cl$ is charged to store a voltage on the bit line that indicates the accumulation result (the sum of multiplication results) of the input bits and bits stored in the bit cells in the column C0.

Similarly, in the duration t2, the computing switches 141$s$1, 152$s$1, 162$s$1 and the compensation switches 141$s$2, 152$s$2, 162$s$2 are turned on, in response to the control voltages v141$s$1, v152$s$1, v162$s$1, v141$s$2, v152$s$2, v162$s$2 being pulled up, to charge the computing capacitors 141$c$1, 152$c$1, 162$cl$ and the compensation capacitors 141$c$2, 152$c$2, 162$c$2. Specifically, each of the computing capacitors 141$c$1, 152$c$1, 162$c$1 and the compensation capacitors 141$c$2, 152$c$2, 162$c$2 is charged to store a voltage that indicates the accumulation result (sum) of multiplication results of the input bits and bits stored in the bit cells in the corresponding column. For example, the computing capacitor 141$cl$ and the compensation capacitor 141$c$ are charged to have a voltage that indicates the accumulation result (sum) of multiplication results of the input bits and bits stored in the bit cells in the column C1.

Figure 8:
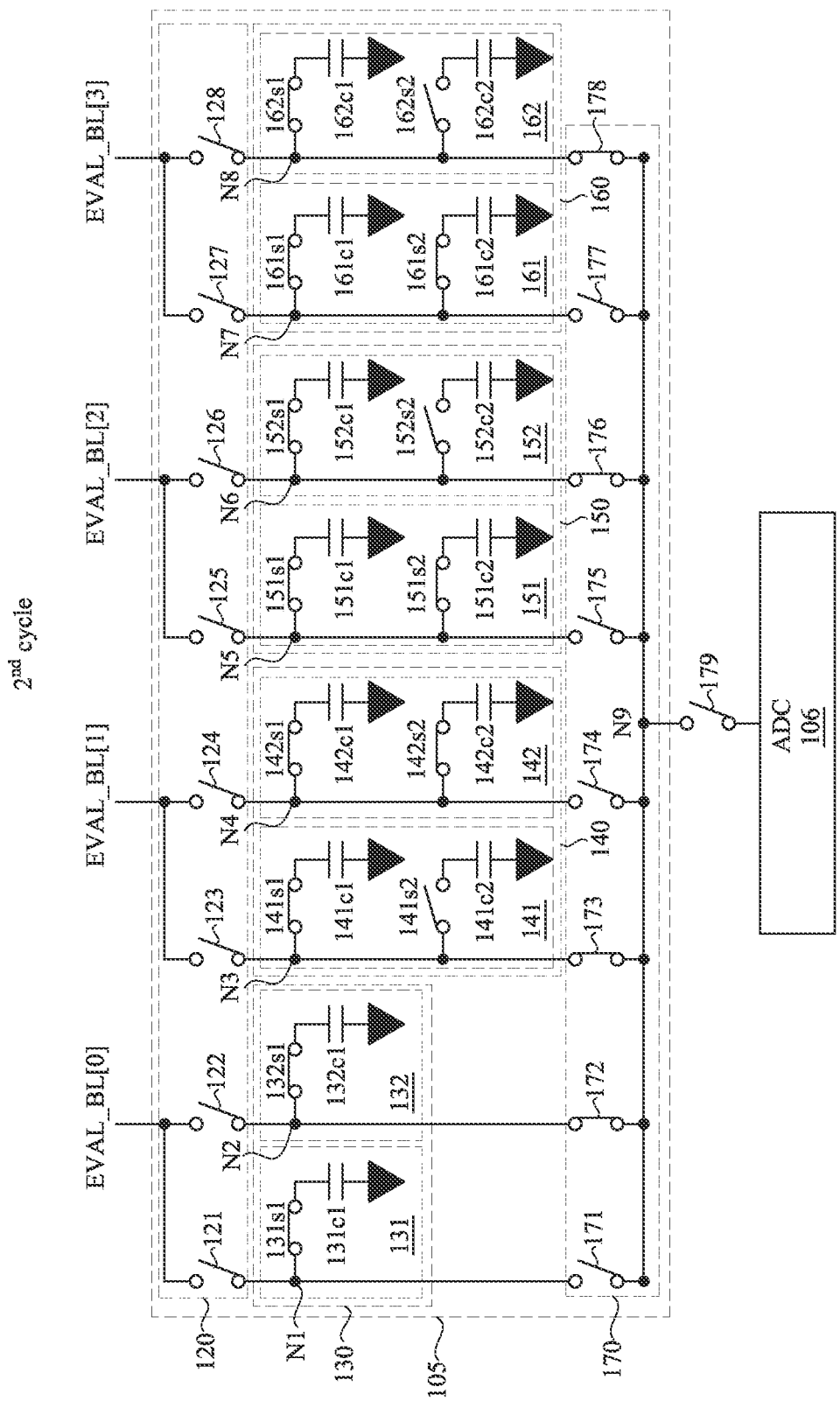

With reference to FIG. 3, FIG. 4 and FIG. 8, in a duration t3 of the second cycle, the switches 122, 123, 126, 128 are turned off in response to the control voltages v122, v123, v126, v128 pulled down. The switches s0 to s3 are turned on in response to the control voltage vBLEQB pulled up. The transistor 303 is turned on, in response to the control voltage vRST_WL on the word line RST_WL being pulled up, to discharge the capacitor 306 to have the ground voltage.

Furthermore, in the duration t3, the controller 110 controls the switch circuit 170 to charge-share the computing capacitors in the four columns to get a weighted mean result of the accumulation results stored in the capacitor circuits of computing capacitors in the four columns.

Specifically, in the duration t3, the compensation switches 141$s$2, 152$s$2 and 162$s$ are turned off in response to the control voltages v141$s$2, v152$s$2 and v162$s$2 being pulled down, and the switches 172, 173, 176, 178 are turned on, in response to the control voltages v172, v1173, v176 and v178 being pulled down, to charge-share the computing capacitors 132$c$1, 141$c$1, 152$c$1, 162$c$1. Specifically, the computing capacitors 132$c$1, 141$c$1, 152$c$1, 162$cl$ are charge-shared to perform a weighted mean operation of the data stored in the computing capacitors 132$c$1, 141$c$1, 152$c$1, 162$c$1, in which the data are sum of multiplication results (MAC results) from bit lines EVAL_BL[0] to EVAL_BL[3]. The weights for the weighted mean operation are according to the capacitances of the computing capacitors 132$c$1, 141$c$1, 152$c$1, 162$c$1. For example, the weights of the weighted mean operation for the data stored in the computing capacitors 132$c$1, 141$c$1, 152$c$1, 162$cl$ are 8, 4, 2 and 1 respectively when the capacitances of the computing capacitors 132$c$1, 141$c$1, 152$c$1, 162$cl$ are 8 cu, 4 cu, 2 cu and 1 cu. After the charge-sharing of the computing capacitors 132$c$1, 141$c$1, 152$c$1, 162$cl$ the computing capacitor 141$c$ 1 has the voltage indicating the weighted mean result of the weighted mean operation.

Then, the computing switches 132$s$1, 141$s$1, 152$s$1, 162$s$1 and the switches 172, 173, 176, 178 are turned off, in response to the control signals v132$s$1, v141$s$1, v152$s$1, v162$s$1, v172, v173, v176, v178 being pulled down, to terminate the charge-sharing.

Figure 9:
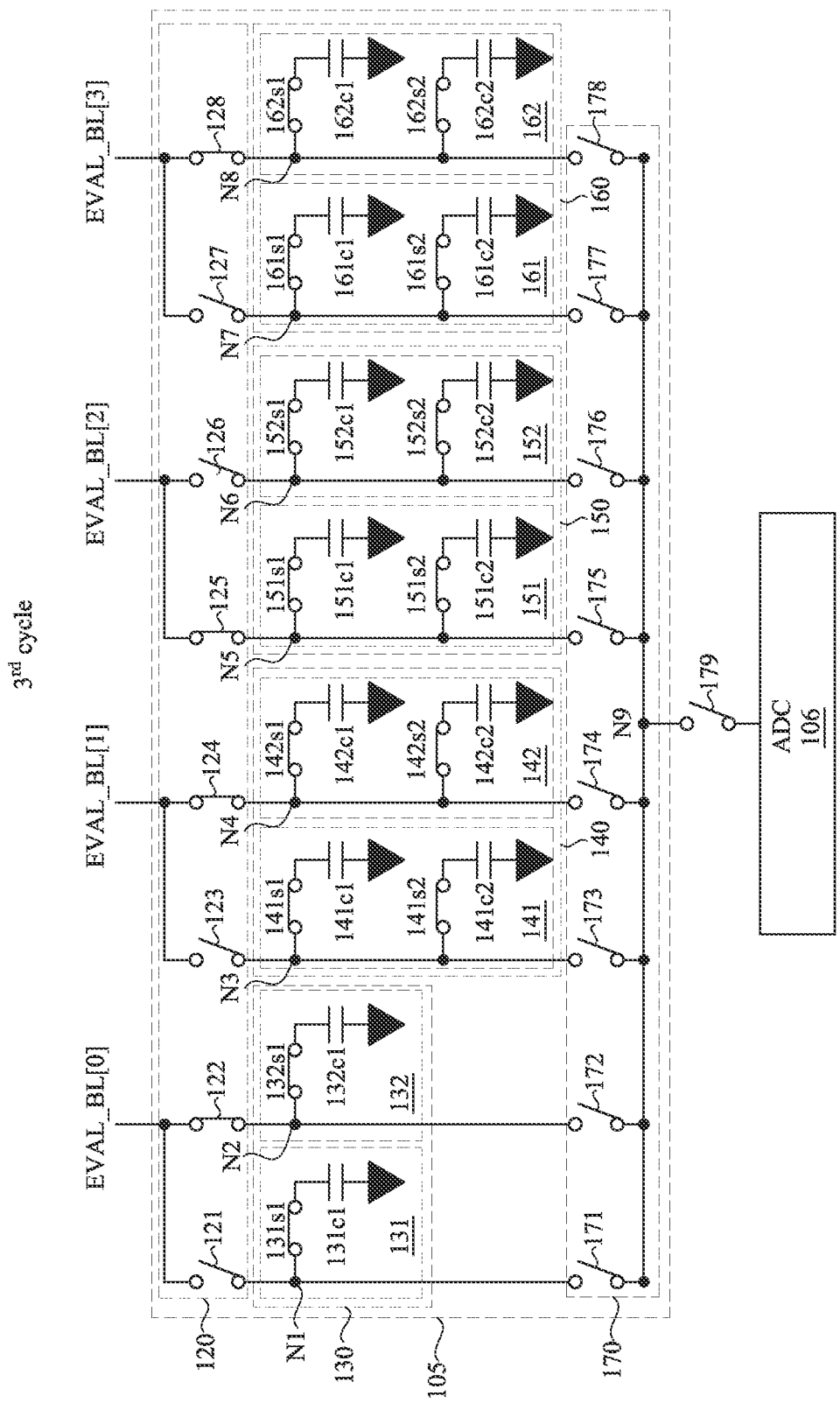

With reference to FIG. 3, FIG. 4 and FIG. 9, in a duration t1 in a third cycle, the CIM array 104 performs a multiplication operation of the MAC operation of the input vector and the stored weight vector and stores corresponding results in the capacitors 306 of the bit cells 110. The configurations of the multiplication operation of the MAC operation are similar to those in the first cycle for the fourth (MSB) of the input vector.

For example, in some embodiments of the multiplication operation, the input buffer 103 forwards second bits "1" and "0" of the elements "1111" and "0101" (e.g., two elements in one input vector) to the word lines IN_WL[0] and IN_WL[1] respectively to perform the multiplication operation of the second bits "1" and "0" of the elements and he stored weight vector.

In the duration t2 of the third cycle, the controller 101 adjusts the control voltages of all word lines IN_WLB (vIN_WLB[0] and vIN_WLB[1]) to have a high voltage level to reset the all word lines and to turn off all the transistors 302 in the bit cells 110. As shown in FIG. 2, the switches s0 to s3 are further turned off in response to the control line BLEQB being pulled down, and accordingly the bit lines EVAL_BL[0] to EVAL_BL[3] are disconnected from the ground.

According to some embodiments, in the duration t2, the CIM array 104 performs an accumulation operation of the MAC operation of the input vector and the stored weight vector to generate accumulation results to the computing circuit 105 through the bit lines, for example, EVAL_BL[0]-EVAL_BL[3].

In the duration t2, the switches 122, 124, 125, 128 are turned on, in response to the control voltage v122, v124, v125, v128 being pulled up, to transmit the voltages on the bit lines EVAL_BL[0]-EVAL_BL[3] to the capacitor circuit pairs 130, 140, 150, 160.

Then, the computing switch 132$s$1 is turned on, in response to the control voltage v132$s$1 pulled up, to charge the computing capacitor 132$cl$ according to the voltage on the bit line EVAL_BL[0]. Specifically, the computing capacitor 132$cl$ is charged to store a voltage on the bit line that indicates the accumulation result (the sum of multiplication results) of the input bits and bits stored in the bit cells in the column C0.

Similarly, in the duration t2, the computing switches 142$s$1, 151$s$1, 162$s$1 and the compensation switches 142$s$2, 151$s$2, 162$s$2 are turned on, in response to the control voltages v142$s$1, v151$s$1, v162$s$1, v142$s$2, v151$s$2, v162$s$2 being pulled up, to charge the computing capacitors 142$c$1, 151$c$1, 162$cl$ and the compensation capacitors 142$c$2, 151$c$2, 162$c$2. Specifically, each of the computing capacitors 142$c$1, 151$c$1, 162$c$1 and the compensation capacitors 142$c$2, 151$c$2, 162$c$2 is charged to store a voltage that indicates the accumulation result (sum) of multiplication results of the input bits and bits stored in the bit cells in the corresponding column.

Figure 10:
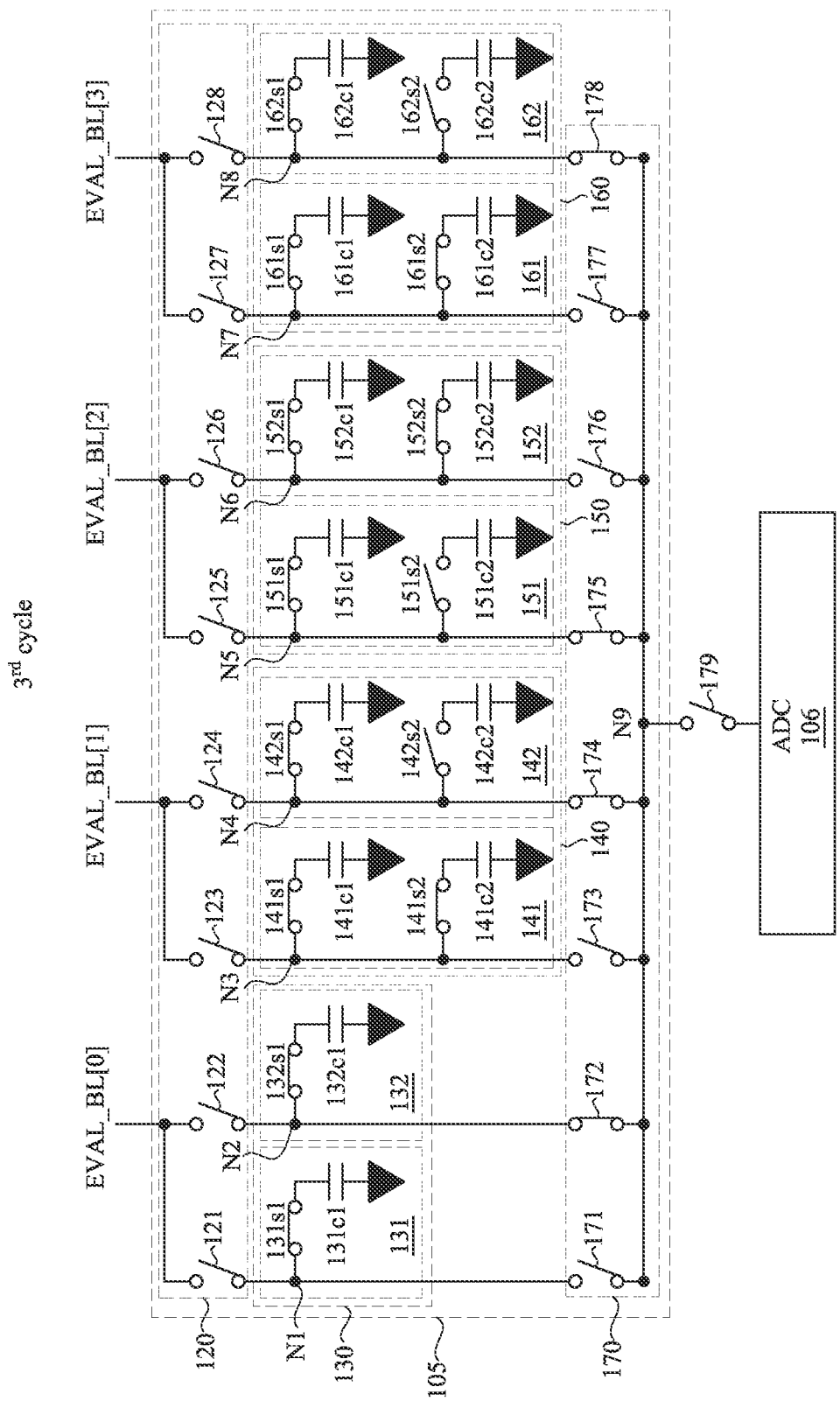

With reference to FIG. 3, FIG. 4 and FIG. 10, in a duration t3 of the third cycle, the switches 122, 124, 125, 128 are turned off in response to the control voltages v122, v124, v125, v128 being pulled down. The switches s0 to s3 are turned on in response to the control voltage vBLEQB being pulled up. The transistor 303 is turned on, in response to the control voltage vRST_WL on the word line RST_WL being pulled up, to discharge the capacitor 306 to have the ground voltage.

Furthermore, in the duration t3, the controller 110 controls the switch circuit 170 to charge-share the computing capacitors in the four columns to get a weighted mean result of the accumulation results stored in the capacitor circuits of computing capacitors in the four columns.

Specifically, in the duration t3, the compensation switches 142$s$2, 151$s$2 and 162$s$ are turned off in response to the control voltages v142$s$2, v151$s$2 and v162$s$2 being pulled down, and the switches 172, 174, 175, 178 are turned on, in response to the control voltages v172, v174, v175 and v178 being pulled up, to charge-share the computing capacitors 132c1, 142c1, 151c1, 162c1. Specifically, the computing capacitors 132c1, 142c1, 151c1, 162cl are charge-shared to perform a weighted mean operation of the data stored in the computing capacitors 132c1, 142c1, 151c1, 162c1, in which the data are sum of multiplication results (MAC results) from bit lines EVAL_BL[0] to EVAL_BL[3]. The weights for the weighted mean operation are according to the capacitances of the computing capacitors 132c1, 142c1, 151c1, 162c1. For example, the weights of the weighted mean operation for the data stored in the computing capacitors 132c1, 142c1, 151c1, 162cl are 8, 4, 2 and 1 respectively when the capacitances of the computing capacitors 132c1, 142c1, 151c1, 162cl are 8 cu, 4 cu, 2 cu and 1 cu. After the charge-sharing of the computing capacitors 132c1, 142c1, 151c1, 162cl the computing capacitor 131cl has the voltage indicating the weighted mean result of the weighted mean operation.

Then, the computing switches 132s1, 142s1, 151s1, 162s1 and the switches 172, 174, 175, 178 are turned off, in response to the control signals v132s1, v142s1, v151s1, v162s1, v172, v174, v175, v178 being pulled down, to terminate the charge-sharing.

Figure 11:
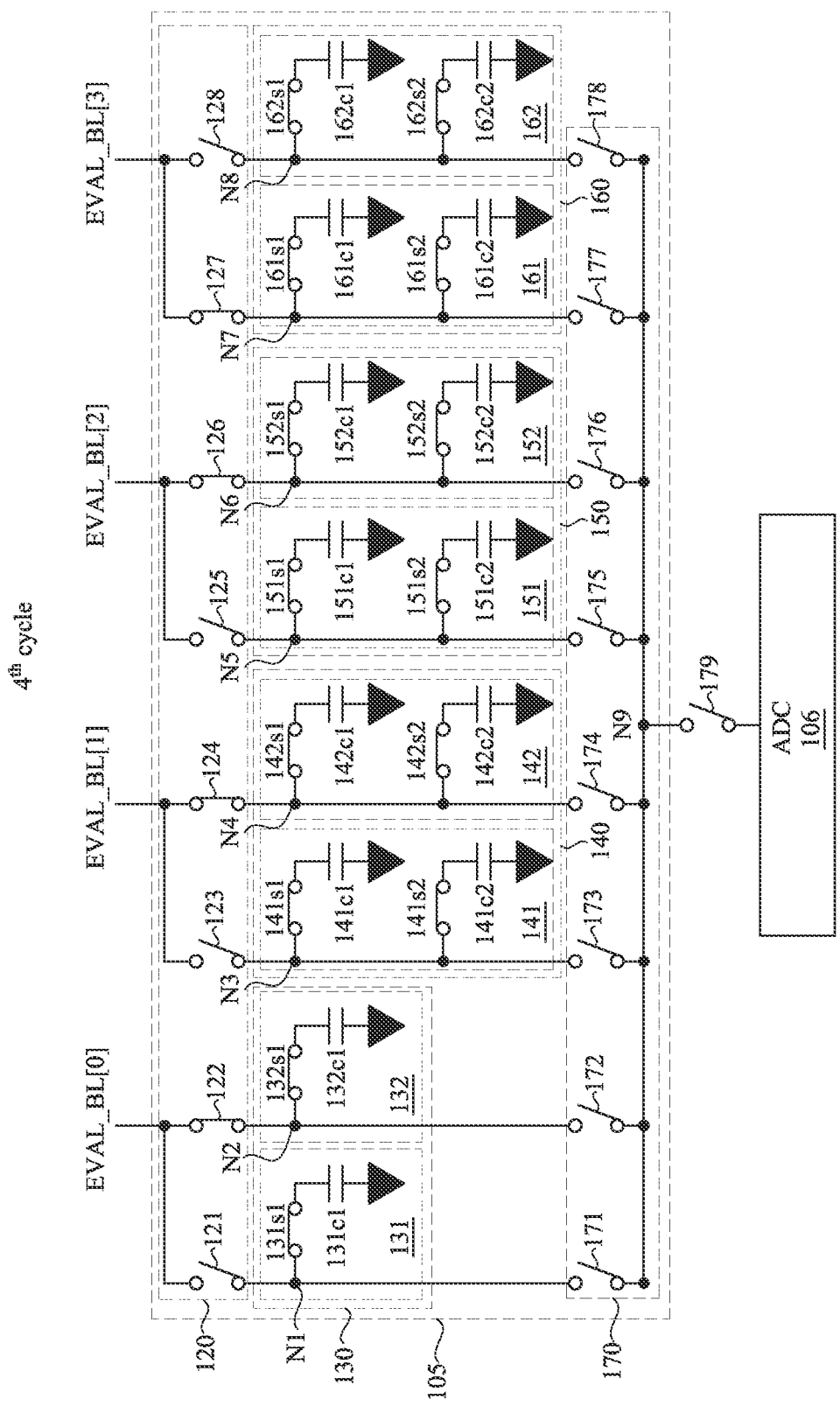

With reference to FIG. 3, FIG. 4 and FIG. 11, in a duration t1 in a fourth cycle, the CIM array 104 performs a multiplication operation of the MAC operation of next bits in the input vector and the stored weight vector and stores corresponding results in the capacitors 306 of the bit cells 110. The configurations of the multiplication operation of the MAC operation are similar to those in the first cycle for the fourth bits (MSB) of the input vector.

For example, in some embodiments of the multiplication operation, the input buffer 103 forwards first bits (least significant bits) "1" and "1" of the elements "1111" and "0101" (e.g., two elements in one input vector) to the word lines IN_WL[0] and IN_WL[1] respectively.

In the duration t2 of the fourth cycle, the controller 101 adjusts the control voltages of all word lines IN_WLB (vIN_WLB[0] and vIN_WLB[1]) to have a high voltage level to reset the all word lines and to turn off all the transistors 302 in the bit cells 110. As shown in FIG. 2, the switches s0 to s3 are further turned off in response to the control line BLEQB being pulled down, and accordingly the bit lines EVAL_BL[0] to EVAL_BL[3] are disconnected from the ground.

According to some embodiments, in the duration t2, the CIM array 104 performs an accumulation operation of the MAC operation of the input vector and the stored weight vector to generate accumulation results to the computing circuit 105 through the bit lines, for example, EVAL_BL[0]-EVAL_BL[3].

In the duration t2, the switches 122, 124, 126, 127 are turned on, in response to the control voltage v122, v124, v126, v127 being pulled up, to transmit the voltages on the bit lines EVAL_BL[0]-EVAL_BL[3] to the capacitor circuit pairs 130, 140, 150 and 160.

Then, the computing switch 132s1 is turned on, in response to the control voltage v132s1 being pulled up, to charge the computing capacitor 132cl according to the voltage on the bit line EVAL_BL[0]. Specifically, the computing capacitor 132cl is charged to store a voltage on the bit line that indicates the accumulation result (the sum of multiplication results) of the input bits and bits stored in the bit cells in the column C0.

Similarly, in the duration t2, the computing switches 142s1, 152s1, 161s1 and the compensation switches 142s2, 152s2, 161s2 are turned on, in response to the control voltages v142s1, v152s1, v161s1, v142s2, v152s2, v161s2 being pulled up, to charge the computing capacitors 142c1, 152c1, 161cl and the compensation capacitors 142c2, 152c2, 161c2. Specifically, each of the computing capacitors 142c1, 152c1, 161cl and the compensation capacitors 142c2, 152c2, 161c2 is charged to store a voltage that indicates the accumulation result (sum) of multiplication results of the input bits and bits stored in the bit cells in the corresponding column.

Figure 12:
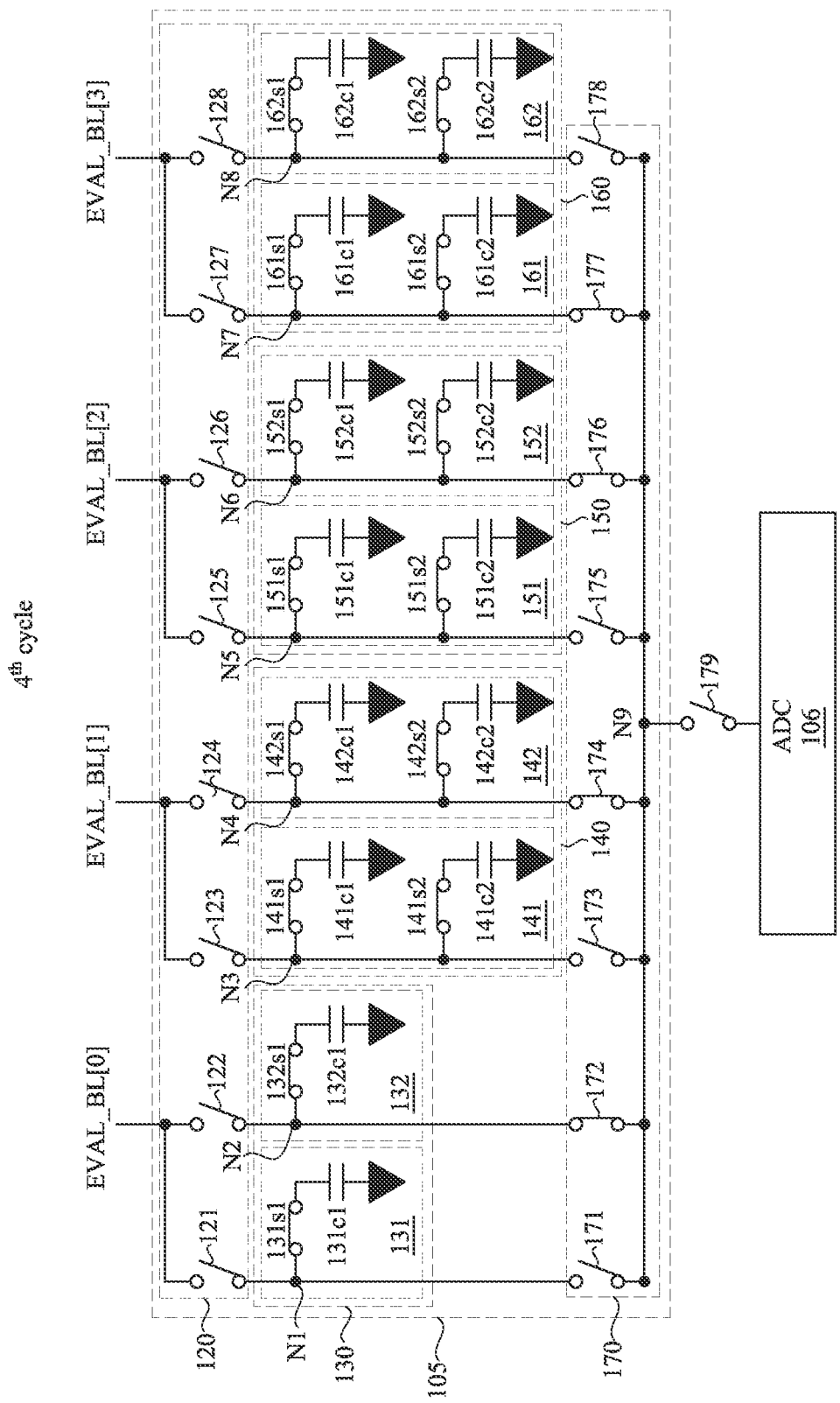

With reference to FIG. 3, FIG. 4 and FIG. 12, in a duration t3 of the fourth cycle, the switches 122, 124, 126, 127 are turned off in response to the control voltages v122, v124, v126, v127 pulled down. The switches s0 to s3 are turned on in response to the control voltage vBLEQB pulled up. The transistor 303 is turned on, in response to the control voltage vRST_WL on the word line RST_WL pulled up, to discharge the capacitor 306 to have the ground voltage.

Furthermore, in the duration t3, the controller 110 controls the switch circuit 170 to charge-share the computing capacitors in the four columns to get a weighted mean result of the accumulation results stored in the capacitor circuits of computing capacitors in the four columns.

Specifically, in the duration t3 of the fourth cycle, the compensation switches 142s2, 152s2 and 161s are turned off in response to the control voltages v142s2, v152s2 and v161s2 being pulled down, and the switches 172, 174, 176, 177 are turned on, in response to the control voltages v172, vl174, v176 and v177 being pulled down, to charge-share the computing capacitors 132c1, 142c1, 152c1, 161c1. Specifically, the computing capacitors 132c1, 142c1, 152c1, 161cl are charge-shared to perform a weighted mean operation of the data stored in the computing capacitors 132c1, 142c1, 152c1, 161c1, in which the data are sum of multiplication results (MAC results) from bit lines EVAL_BL[0] to EVAL_BL[3]. After the charge-sharing of the computing capacitors 132c1, 142c1, 152c1, 161cl the computing capacitor 161cl has the voltage indicating the weighted mean result of the weighted mean operation.

Then, the computing switches 132s1, 142s1, 152s1, 161s1 and the switches 172, 174, 176, 177 are turned off, in response to the control signals v132s1, v142s1, v152s1, v161s1, v172, v174, v176, v177 being pulled down, to terminate the charge-sharing.

Figure 13:
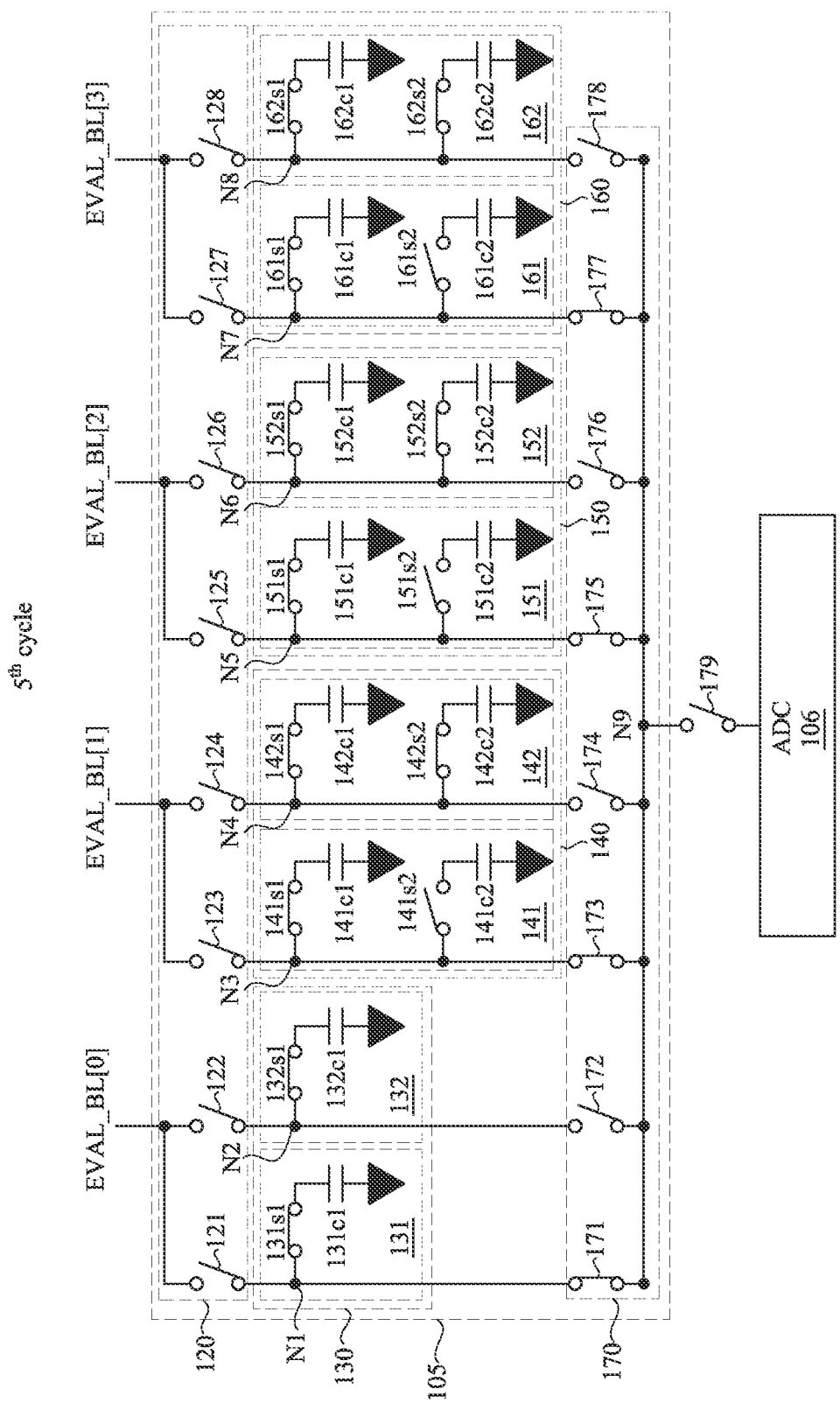

With reference to FIG. 4 and FIG. 13, in a fifth cycle, after the computing switches 132s1, 142s1, 152s1, 161s1 and the switches 172, 174, 176, 177 are turned off, the controller 101 pulls up the control voltages v131s1, v141s1, v151s1 and v161s1 to turn on the computing switches 131s1, 141s1, 151s1 and 161s1 respectively. Then, the controller 101 pulls up the control voltages v171, v173, v175, v177 to turn on the switches 171, 173, 175, 177 respectively to charge-share the computing capacitors 131c1, 141c1, 151c1, 161c1. The controller 101 charge-share the computing capacitors 131c1, 141c1, 151c1, 161cl to perform a weighted mean operation of the data stored in the computing capacitors 131c1, 141c1, 151c1, 161c1, in which the data are the weighted mean results in the first to fourth cycles. The weights for the weighted mean operation are according to the capacitances of the computing capacitors 131c1, 141c1, 151c1, 161c1. After the charge-sharing of the computing capacitors 132c1, 142c1, 152c1, 161c1, the controller 101 generates a control signal to turn on the switch 179 to output a voltage at a node N9 that indicates the weighted mean result of the four weighted mean results in the first to fourth cycles.

Then the ADC 106 generate a four-bit digital output that is a MAC result of the input vector and the stored vector in the CIM array 104 according to the voltage at the node N9. In some embodiments, the ADC 106 is a successive-approximation register (SAR) ADC. In various embodiments, the ADC 106 is a flash ADC.

The configurations of FIG. 4 to FIG. 13 are given for illustrative purposes. Various implements are within the contemplated scope of the present disclosure. For example, in some embodiments, the input buffer 103 forwards the first bits of the input vector to the CIM array 104 in the first cycle and stores the weighted mean result in the computing capacitor 161c1.

Figure 14:
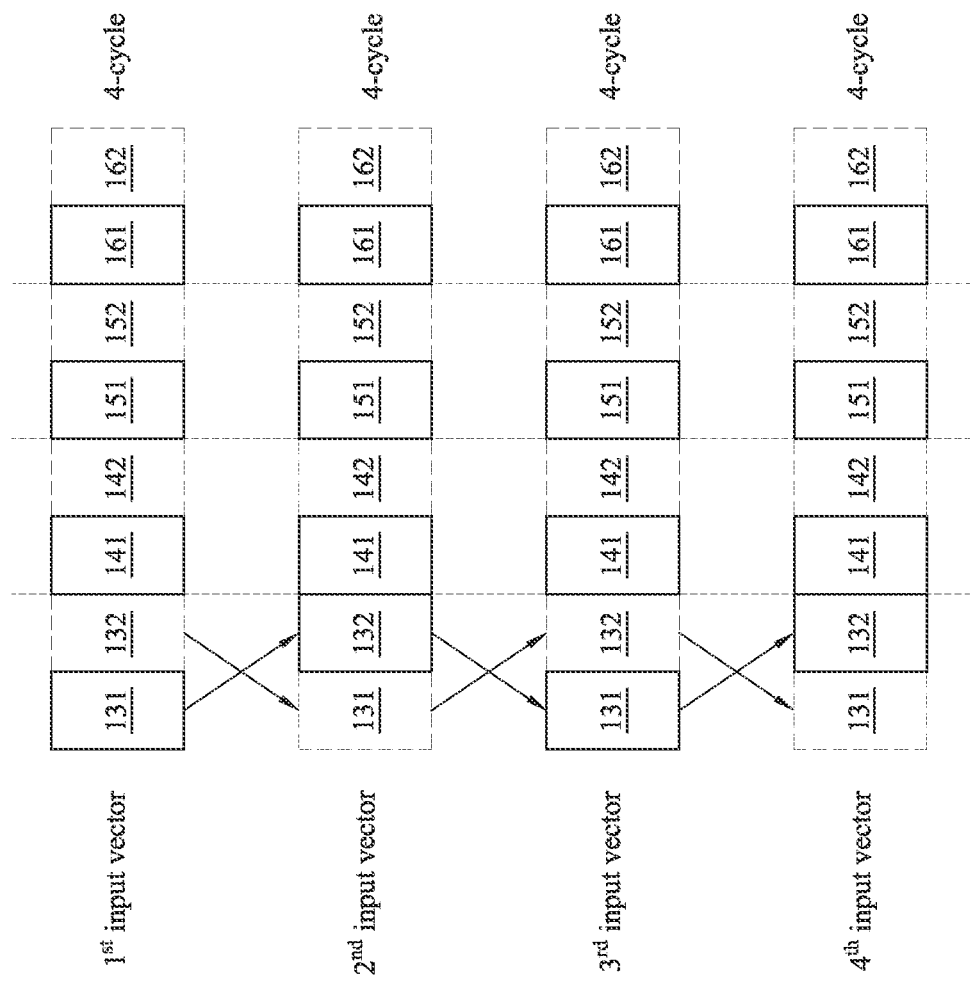
FIG. 14 is a schematic diagram of operations of a memory device for different input vectors in accordance with various embodiments of the present disclosure.

Reference is now made to FIG. 14. FIG. 14 is a schematic diagram of operations of the memory device 100 for different input vectors in accordance with various embodiments of the present disclosure. For illustration, in some embodiments, the controller 101 controls a capacitor circuit of a capacitor circuit pair to store the weighted mean result in four cycles and controls another capacitor circuit of the capacitor circuit pair to store the weighted mean result in other four cycles.

For example, for a first input vector, the controller 101 controls the capacitor circuits 131, 141, 151, 161 to store the four weighted mean results in the first to fourth cycles. Specifically, the controller controls the capacitor circuits 131, 141, 151, 161 to store the four weighted mean results in the first to fourth cycles in the computing capacitors 131c1, 141c1, 151c1 and 161c1 as described above with reference to FIG. 4 to FIG. 13.

With reference to FIG. 2 and FIG. 14, then, in the fifth to eighth cycles, to perform a MAC operation of a second input vector, the controller 101 controls the capacitor circuits 132, 141, 151, 161 to store the four weighted mean results in the fifth to eighth cycles. Specifically, in the fifth cycle, when the switches 172, 173, 175, 177 and 179 are turned on to output the voltage at the node N9 to the ADC 106, the controller 101 turns on the switches 122, 124, 126, 128 and the computing switches 132s1, 142s1, 152s1, 162s1 to store MAC results from the bit lines EVAL_BL[0] to EVAL_BL[3] in the computing capacitors 132c1, 142c1, 152c1, 162c1. Then, the controller 101 controls the capacitor circuits 132 to store a weighted mean result of the four MAC results in the computing switches 132s1, 142s1, 152s1, 162s1 in the fifth cycle.

Then, in the ninth to twelfth cycles, to perform a MAC operation of a third input vector, the controller 101 controls the capacitor circuits 131, 141, 151, 161 to store the four weighted mean results in the ninth to twelfth cycles, in the thirteenth to sixteenth cycles, to perform a MAC operation of a fourth input vector, the controller 101 controls the capacitor circuits 132, 141, 151, 161 to store the four weighted mean results in the thirteenth to sixteenth cycles, and so on.

The configurations of FIG. 14 are given for illustrative purposes. Various implements are within the contemplated scope of the present disclosure. For example, in some embodiments, the controller 101 alternatively controls one of the capacitor circuit pair 160 to store a weighted mean result. For example, the input buffer 103 forwards the first bits of the first input vector to the CIM array 104 in the first cycle and stores the weighted mean result in the capacitor circuit 161. The input buffer 103 forwards the first bits of the second input vector to the CIM array 104 in the fifth cycle and stores the weighted mean result in the capacitor circuit 162.

Figure 15:
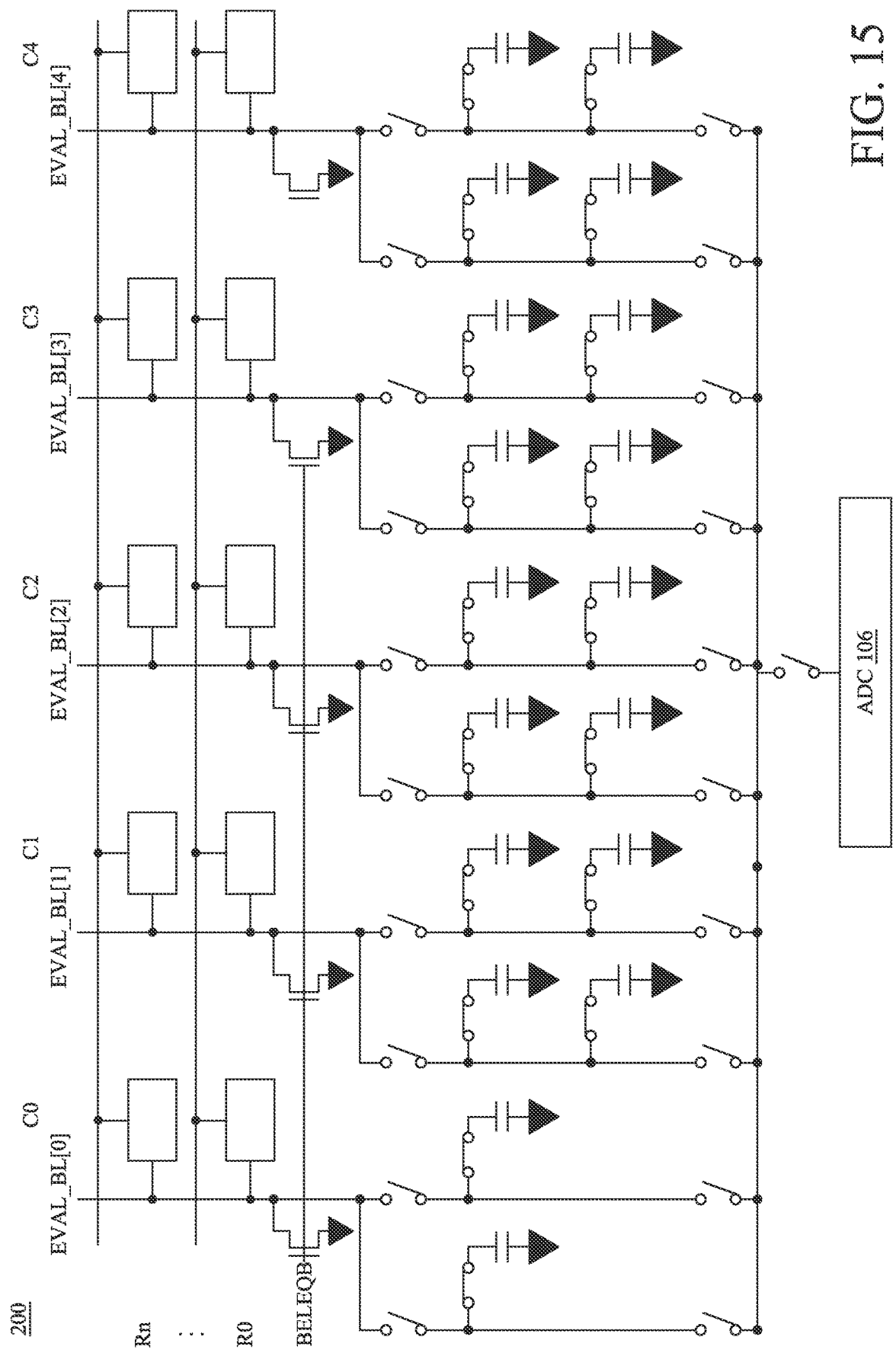
FIG. 15 is a schematic diagram of a memory device corresponding to a memory device in FIG. 2 in accordance with various embodiments of the present disclosure.

Reference is now made to FIG. 15. FIG. 15 is a schematic diagram of a memory device 200 corresponding to the memory device 100 in FIG. 2 in accordance with various embodiments of the present disclosure. The memory device 200 is configured according to the memory device 100. The difference between the memory devices 200 and 100 is that the memory device 200 has more than four columns of bit cells 110 instead of only having four columns of bit cells 110. For example, in some embodiments, the memory device 200 has five columns of bit cells and five capacitor circuit pairs. In this way, the memory device 200 can perform a MAC operation of input and stored vectors with elements of five-bit binary number and generate a five-bit digital output of MAC result.

The configurations of FIG. 15 are given for illustrative purposes. Various implements are within the contemplated scope of the present disclosure. For example, in some embodiments, the difference between the memory devices 200 and 100 is that the memory device 200 has fewer than four columns of bit cells 110 instead of having four columns of bit cells 110. For example, in some embodiments, the memory device 200 have only two columns of bit cells 110.

Figure 16:
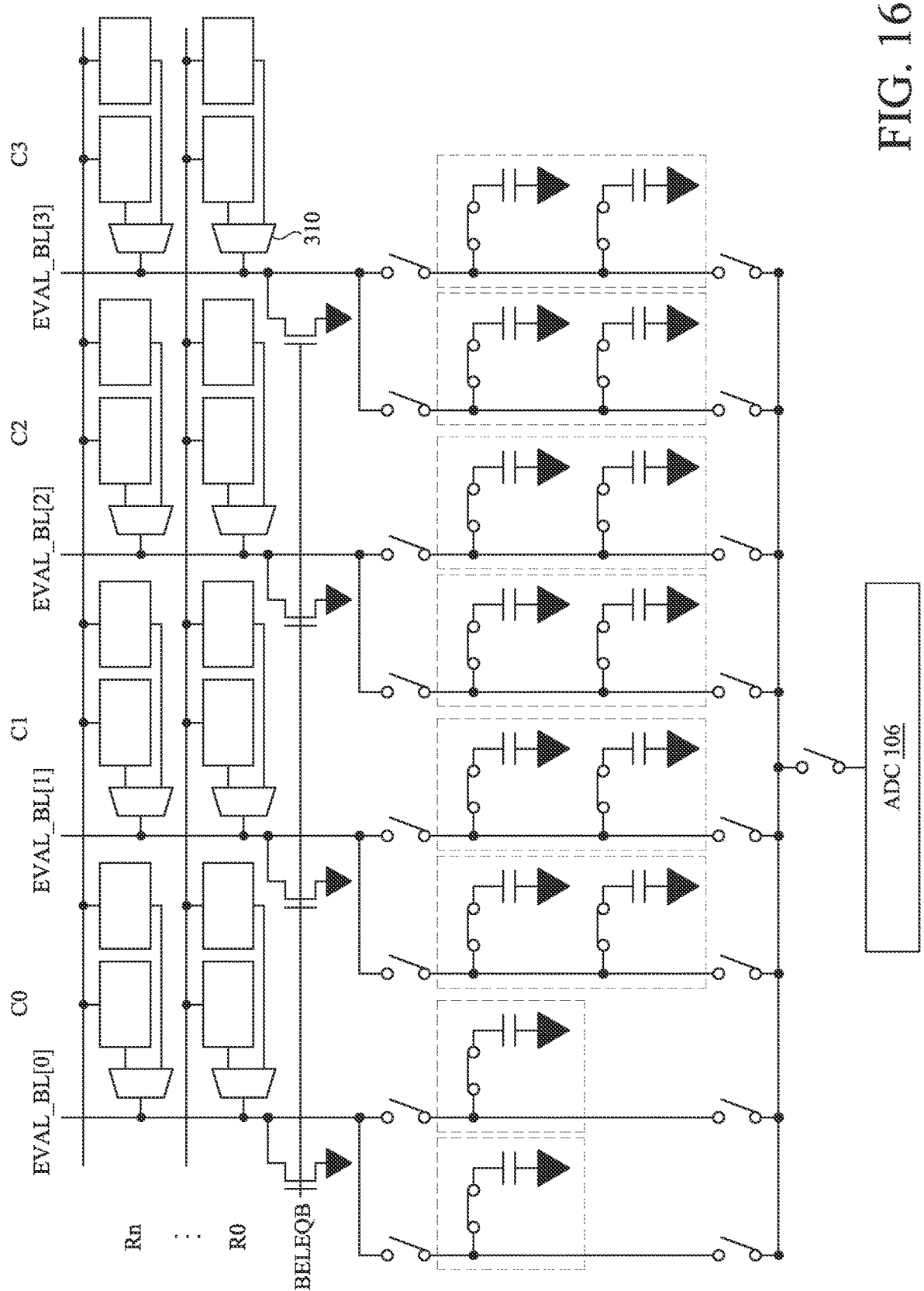
FIG. 16 is a schematic diagram of a memory device corresponding to the memory device in FIG. 2 in accordance with various embodiments of the present disclosure.

Reference is now made to FIG. 16. FIG. 16 is a schematic diagram of a memory device 300 corresponding to the memory device 100 in FIG. 2 in accordance with various embodiments of the present disclosure. The memory device 300 is configured according to the memory device 100. The difference between the memory devices 300 and 100 is that the memory device 300 includes two bit cells 110 corresponding to a column and a row and a multiplexer (MUX) 310 coupled to the two bit cells 110 corresponding to the column and the row. As shown in FIG. 16, the two bit cells 110 corresponding to a column and a row are coupled to a word line IN_WL of the row and the MUX 310 is coupled between the two bit cells 110 and a bit line EVAL_BL of the column. For example, the two bit cells 110 corresponding to the column C0 and the row R0 are coupled to the word line IN_WL[0] and the MUX 310 corresponding to the column C0 and the row R0 is coupled between the two bit cells and the bit line EVAL_BL[0]. In some embodiments, the controller 101 generates one of control signals to each MUX 310 to select one of the two bit cells coupled thereto.

The configurations of FIG. 16 are given for illustrative purposes. Various implements are within the contemplated scope of the present disclosure. For example, in some embodiments, the difference between the memory devices 300 and 100 is that the memory device 300 include more than two bit cells 110 corresponding to a column and a row and a multiplexer (MUX) 310 coupled to each bit cell 110 corresponding to the column and the row.

Reference is now made to FIG. 17. FIG. 17 is a flow chart of a method 400 for operating the memory devices 100, 200 and 300 corresponding to FIG. 1 to FIG. 16, in accordance with various embodiments of the present disclosure. It is understood that additional operations can be provided before, during, and after the processes shown by FIG. 17, and some of the operations described below can be replaced or eliminated, for additional embodiments of the method. The order of the operations/processes may be interchangeable. Throughout the various views and illustrative embodiments, like reference numbers are used to designate like elements. The method 400 includes operations 401-405 that are described below with reference to FIGS. 1-16.

In operation 401, a memory device (e.g., the memory device 100) performs a MAC operation of an input vector and a stored vector in a number of cycles (e.g., four cycles as described in FIG. 4). Each cycle corresponds to portions of bits in elements of the input vector. For example, in some embodiments, first to fourth cycles correspond to fourth to first bits of elements in the input vector. According to at least one embodiment of the present disclosure, performing the MAC operation in each cycle includes operation 402 to operation 404 described below.

In operation 402, the memory device performs multiplication operations of corresponding bits in the input vector and the stored vector. For example, the controller 101 controls each bit cells 110 in the CIM array 104 to perform a multiplication operation of a bit of the input vector and a bit of the stored vector stored by the storage element 301 in the bit cell 110. The memory device further stores multiplication results in bit cells 110. For example, the capacitor 306 of each of the bit cells 110 stores a multiplication result of a bit of the input vector and a bit of the stored vector stored in the storage element 301.

In some embodiments, in a first cycle of the number of cycles, the memory device performs multiplication operation of a first bit of each of the elements in the input vector with the stored vector; in a second cycle of the number of cycles, the memory device performs multiplication operation of a second bit of each of the elements in the input vector with the stored vector. For example, when the input vector is "1010", the memory device performs multiplication operation of the most significant bit "1" with the stored vector in a first cycle and the memory device performs multiplication operation of a next bit "0" with the stored vector in a second cycle.

In operation 403, the memory device performs accumulation operations to the multiplication results. For example, the transistors 305 of bit cells are turned on in response to a control voltage being adjust by the controller 101, and the multiplication results stored in the bit cells are transmitted to bit lines (e.g., bit lines EVAL_BL[0]-EVAL_BL[3]) to generate accumulation results of the multiplication results. The memory device stores the accumulation results to capacitor circuits (e.g., capacitor circuits 131, 132, 141, 142, 151, 152, 161, 162) through the bit lines.

In some embodiments, each of the bit lines is coupled to corresponding two switches (e.g., the bit line EVAL_BL[0] is coupled to switches 121 and 122) and the memory device turns on one of corresponding two switches to store the accumulation results to corresponding capacitors in the computing capacitors. For example, the memory device turns on the switch 121 to store the accumulation results to the computing capacitor 131c1.

In some embodiments, in a cycle, the memory device turns off a switch coupled to the corresponding one capacitor that stores the weighted mean result in a cycle before the current cycle to store the accumulation results to corresponding capacitors in the computing capacitors. For example, when the computing capacitor 131c1 stores a weighted mean result in the first cycle. Then, the computing switch 131s1 is turned off in a second cycle after the first cycle to store an accumulation result in the computing capacitor 132c1.

In operation 404, the memory device charge share computing capacitors (e.g., computing capacitors 131c1, 132c1, 141c1, 142c1, 151c1, 152c1, 161c1, 162c1) in the capacitor circuits to generate a weighted mean result of the accumulation results. Then, the memory device stores the weighted mean result in a corresponding one capacitor in the computing capacitors. For example, the memory device stores the weighted mean result in the computing capacitors 131c1, 141c1, 151c1 and 161c1 in first to fourth cycles respectively.

In some embodiments, capacitors of each of the capacitor circuits have a same total capacitance (e.g., 8 cu), in which the capacitors include one of the computing capacitors. The memory device turns on computing switches coupled to the computing capacitors and turns off compensation switches coupled to compensation capacitors in the capacitor circuits to charge-share the computing capacitors. For example, as shown in FIG. 13, the memory device turns on computing switches 131s1, 141s1, 151s1, 161s1 and turns off the compensation switches 141s2, 151s2, 161s2 to charge-share the computing capacitors 131c1, 141c1, 151c1, 161c1.

In operation 405, the memory device generates a MAC result of the MAC operation through charge-sharing the computing capacitors.

As described above, the present disclosure provides a memory device with a CIM array and method for operating the memory device. The memory device can perform CIM operations of multibit vectors, for example, MAC operations of two multibit vectors. By adopting the design of the proposed memory device, the number of capacitors used for computing the CIM operations can be reduced by about 50 percent in comparison to some approaches.

In some embodiments, a memory device is provided. The memory device includes a CIM array, capacitor circuit pairs, a first switch circuit and an analog-to-digital converter. The CIM array including bit cells that are arranged in columns, in which the CIM array generates, in response to an input vector and a stored vector in the bit cells, accumulation results. The capacitor circuit pairs receive the accumulation results through bit lines, in which portions, in one of the columns, of the bit cells and a corresponding one of capacitor circuit pairs are coupled to a corresponding bit line of the bit lines. The first switch circuit is coupled to the capacitor circuit pairs is switched to generate, based on the accumulation results, weight mean results in one capacitor circuit in each of the plurality of capacitor circuit pairs. The analog-to-digital converter generates, according to the plurality of weight mean results, a multiply-and-accumulate result.

In some embodiments, a memory device is provided. The memory device includes a CIM array, first switches, capacitor circuits, second switches and an analog-to-digital converter. The CIM array is coupled to word lines and bit lines. Every two of the first switches are coupled to one of the bit lines. Each of the capacitor circuits is coupled to a corresponding one of first switches. Each of the second switches coupled to a corresponding one of the capacitor circuits. The analog-to-digital converter is coupled to the plurality of second switches. The CIM array, the first switches, the capacitor circuits, the second switches, and the analog-to-digital converter cooperate to generate, in response to an input vector, a multiply-and-accumulate result.

In some embodiments, a method is provided. The method includes: performing a multiply-accumulate operation of an input vector and a stored vector in a number of cycles, each cycle corresponding to portions of bits in elements of the input vector, in which performing the multiply-accumulate operation in each cycle includes: performing multiplication operations of corresponding bits in the input vector and the stored vector, and storing multiplication results in bit cells of a memory device; performing accumulation operations to the multiplication results, and storing accumulation results to capacitor circuits of the memory device through bit lines coupled to the bit cells; and charge-sharing computing capacitors in the capacitor circuits to generate a weighted mean result of the accumulation results and storing the weighted mean result in a corresponding one capacitor in the computing capacitors; and generating a multiply-accumulate result of the multiply-accumulate operation through charge-sharing the computing capacitors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a compute-in-memory (CIM) array comprising a plurality of bit cells that are arranged in a plurality of columns, wherein the CIM array is configured to generate, in response to an input vector and a stored vector in the bit cells, a plurality of accumulation results;
a plurality of capacitor circuit pairs configured to receive the plurality of accumulation results through bit lines, wherein portions, in one of the plurality of columns, of the plurality of bit cells and a corresponding one of the plurality of capacitor circuit pairs are coupled to a corresponding bit line of the bit lines;
a first switch circuit coupled to the plurality of capacitor circuit pairs, and configured to be switched to generate, based on the plurality of accumulation results, a plurality of weight mean results in one capacitor circuit in each of the plurality of capacitor circuit pairs; and
an analog-to-digital converter configured to generate, according to the plurality of weight mean results, a multiply-and-accumulate (MAC) result.

2. The memory device of claim 1, further comprising:
a second switch circuit coupled between the CIM array and the plurality of capacitor circuit pairs, and comprising:
a plurality of first switches each coupled to a corresponding capacitor circuit in the plurality of capacitor circuit pairs.

3. The memory device of claim 2, wherein half of the plurality of first switches are configured to be turned on to transmit the plurality of accumulation results to first capacitor circuits in each of the plurality of capacitor circuit pairs while the other half of the plurality of first switches are turned off.

4. The memory device of claim 3, wherein the first switch circuit comprises:
a plurality of second switches coupled in parallel between the analog-to-digital converter and the plurality of capacitor circuit pairs,
wherein when the half of the plurality of first switches are turned on, the plurality of second switches are turned off to electrically disconnect the plurality of capacitor circuit pairs from the analog-to-digital converter.

5. The memory device of claim 2, wherein the first switch circuit comprises:
a plurality of second switches coupled in parallel between the analog-to-digital converter and the plurality of capacitor circuit pairs,
wherein when half of the plurality of second switches are turned on to electrically couple first capacitor circuits in each of the plurality of capacitor circuit pairs with each other, the second switch circuit is configured to be turned off to electrically disconnect the plurality of capacitor circuit pairs from the CIM array.

6. The memory device of claim 1, wherein a number of capacitors included in a first pair of the plurality of capacitor circuit pairs is different from a number of capacitors included in a second pair of the plurality of capacitor circuit pairs.

7. The memory device of claim 6, wherein a total capacitance of the first pair of the plurality of capacitor circuit pairs is the same as a total capacitance of the second pair of the plurality of capacitor circuit pairs.

8. The memory device of claim 6, wherein each capacitor circuit in the plurality of capacitor circuit pairs comprises a computing capacitor to store a corresponding one of the plurality of accumulation results,
wherein capacitances of the computing capacitors in different pairs in the plurality of capacitor circuit pairs are different.

9. The memory device of claim 1, wherein the CIM array further comprises:
a plurality of multiplexers each coupled to corresponding two cells of the plurality of bit cells in a corresponding column of the plurality of columns, and further coupled to a corresponding bit line.

10. The memory device of claim 9, further comprising:
a control circuit configured to generate one of control signals to each in the plurality of multiplexers,
wherein each of the plurality of multiplexers is configured to selectively couple one in the corresponding two cells to the corresponding bit line in response to the one of the control signals.

11. A memory device, comprising:
a compute-in-memory (CIM) array coupled to a plurality of word lines and a plurality of bit lines;
a plurality of first switches, wherein every two of the first switches are coupled to one of the plurality of bit lines;
a plurality of capacitor circuits each coupled to a corresponding one of the plurality of first switches;
a plurality of second switches each coupled to a corresponding one of the plurality of capacitor circuits; and
an analog-to-digital converter coupled to the plurality of second switches,
wherein the CIM array, the plurality of first switches, the plurality of capacitor circuits, the plurality of second switches, and the analog-to-digital converter are configured to cooperate to generate, in response to an input vector, a multiply-and-accumulate (MAC) result.

12. The memory device of claim 11, wherein each in a portion of the plurality of capacitor circuits comprises a computing capacitor and a compensation capacitor that have different capacitances.

13. The memory device of claim 11, wherein each of the plurality of capacitor circuits has a computing capacitor.

14. The memory device of claim 13, wherein a portion of the plurality of first switches are configured to be turned on to electrically couple a portion of the plurality of capacitor circuits to the plurality of bit lines,
wherein a ratio of capacitances of the computing capacitor in the portion of the plurality of capacitor circuits is 8:4:2:1.

15. The memory device of claim 11, wherein the CIM array is configured generate, in response to the input vector, a plurality of accumulation results to the plurality of capacitor circuits,
the plurality of second switches are configured to be switched to generate, based on the plurality of accumulation results, a plurality of weight mean results in a portion of the capacitor circuits, and the analog-to-digital converter is configured to generate, according to the plurality of weight mean results, the multiply-and-accumulate result.

16. A method, comprising:

performing a multiply-accumulate operation of an input vector and a stored vector in a number of cycles, each cycle corresponding to portions of bits in elements of the input vector, wherein performing the multiply-accumulate operation in each cycle comprises:

performing multiplication operations of corresponding bits in the input vector and the stored vector, and storing multiplication results in bit cells of a memory device;

performing accumulation operations to the multiplication results, and storing accumulation results to capacitor circuits of the memory device through bit lines coupled to the bit cells; and charge-sharing computing capacitors in the capacitor circuits to generate a weighted mean result of the accumulation results and storing the weighted mean result in a corresponding one capacitor in the computing capacitors; and generating a multiply-accumulate result of the multiply-accumulate operation through charge-sharing the computing capacitors.

17. The method of claim 16, wherein, in a first cycle of the number of cycles, performing the multiplication operations comprises:

performing multiplication operations of a first bit of each of the elements in the input vector with the stored vector, wherein, in a second cycle of the number of cycles, performing the multiplication operations comprises:

performing multiplication operations of a second bit of each of the elements in the input vector by the stored vector.

18. The method of claim 16, wherein each of the bit lines is coupled to corresponding two switches, wherein storing the accumulation results comprises:

turning on one of the corresponding two switches to store the accumulation results to corresponding capacitors in the computing capacitors.

19. The method of claim 16, wherein, in a first cycle of the number of cycles, storing the accumulation results further comprises:

turning off a switch coupled to the corresponding one capacitor that stores the weighted mean result in a second cycle, before the first cycle, of the number of cycles to store the accumulation results to corresponding capacitors in the computing capacitors.

20. The method of claim 16, wherein capacitors of each of the capacitor circuits have a same total capacitance, wherein the capacitors comprise one of the computing capacitors, wherein generating the multiply-accumulate result further comprises:

turning on computing switches coupled to the computing capacitors and turning off compensation switches coupled to compensation capacitors in the capacitor circuits to charge-share the computing capacitors.

\* \* \* \* \*